(12) United States Patent
Lieu et al.

(10) Patent No.: US 10,112,491 B2
(45) Date of Patent: Oct. 30, 2018

(54) FLYWHEEL/BATTERY HYBRID ENERGY STORAGE AND POWER MANAGEMENT SYSTEM

(71) Applicant: THE REGENTS OF THE UNIVERSITY OF CALIFORNIA, Oakland, CA (US)

(72) Inventors: Dennis K. Lieu, Moraga, CA (US); Daniel R. Talancon, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 263 days.

(21) Appl. No.: 15/135,243

(22) Filed: Apr. 21, 2016

(65) Prior Publication Data

US 2016/0311325 A1   Oct. 27, 2016

Related U.S. Application Data

(60) Provisional application No. 62/151,878, filed on Apr. 23, 2015.

(51) Int. Cl.
| | |
|---|---|
| *B60L 11/16* | (2006.01) |
| *B60L 11/18* | (2006.01) |
| *B60W 20/00* | (2016.01) |
| *B60W 10/24* | (2006.01) |
| *B60K 6/30* | (2007.10) |
| *B60L 7/26* | (2006.01) |

(52) U.S. Cl.
CPC ............... *B60L 11/16* (2013.01); *B60K 6/30* (2013.01); *B60L 7/26* (2013.01); *B60L 11/1851* (2013.01); *B60W 10/24* (2013.01); *B60W 20/00* (2013.01); *B60L 2210/10* (2013.01); *B60L 2240/421* (2013.01); *B60L 2240/423* (2013.01); *Y02T 10/648* (2013.01); *Y02T 10/705* (2013.01); *Y02T 10/7005* (2013.01); *Y02T 10/7027* (2013.01); *Y02T 10/7033* (2013.01); *Y02T 10/7216* (2013.01); *Y10S 903/907* (2013.01); *Y10S 903/96* (2013.01)

(58) Field of Classification Search
CPC ........ B60L 11/16; B60L 11/1851; B60L 7/26; B60L 2240/421; B60L 2240/423; B60K 6/30; B60W 10/24; B60W 20/00; Y02T 10/648; Y02T 10/7005; Y02T 10/7027; Y02T 10/7033; Y02T 10/705; Y02T 10/7216
USPC ................. 307/10.1, 9.1, 10.7; 320/103, 104
See application file for complete search history.

(56) References Cited

PUBLICATIONS

Lieu, Daniel K. et al., "INSTAR: INertial STorage and Recovery, Flywheel Energy Storage System for Improved Hybrid Vehicle Efficiency", University of California, Berkeley, CA, poster displayed as Cal Day 2012, one page.*

(Continued)

*Primary Examiner* — Thomas Skibinski
(74) *Attorney, Agent, or Firm* — O'Banion & Ritchey LLP; John P. O'Banion

(57) ABSTRACT

A hybrid/electric vehicle power management system in which an Inertial Storage and Recovery System (INSTAR) utilizes an enhanced Flywheel Energy Storage (FES) system to reach higher vehicle efficiencies. INSTAR allows regenerative braking energy surges to be readily stored at high efficiency on the flywheel, whose energy is then converted to power for driving the motors, or charging the batteries at an efficient charging rate.

20 Claims, 16 Drawing Sheets

(56) References Cited

PUBLICATIONS

Talancon, Daniel et al., "UC Berkeley INSTAR Flywheel Electric Hybrid System Animation V1.0 low res", excerpted from YouTube video located at https://www.youtube.com/watch?v=I7LOzm02Z4w, uploaded to Youtube on Dec. 14, 2011, pp. 1-12.*

Talancon, Daniel, "INSTAR Triple Hybrid Vehicle", Techbriefs, Jun. 30, 2010, downloaded from http://contest.techbriefs.com/2010/entries/transportation/1017 on Apr. 22, 2016, pp. 1-4.

Talancon, Daniel et al., "INSTAR Full System Test", excerpted from YouTube video "INSTAR Full System Test" located at https://www.youtube.com/watch?v=MXNWfLmfVEc, uploaded to YouTube on Feb. 4, 2015, pp. 1-2.

Lieu, Daniel K. et al., "INSTAR: INertial STorage and Recovery, Flywheel Energy Storage System for Improved Hybrid Vehicle Efficiency", University of California, Berkeley, CA, poster displayed at Cal Day 2012, one page.

* cited by examiner

FLYWHEEL/BATTERY HYBRID ENERGY STORAGE AND POWER MANAGEMENT SYSTEM

CROSS-REFERENCE TO RELATED APPLICATIONS

This application claims priority to, and the benefit of, U.S. provisional patent application Ser. No. 62/151,878 filed on Apr. 23, 2015, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to regenerative braking systems, and more particularly to regenerative braking that stores power in a combination of a flywheel and batteries.

2. Background Discussion

During the past century, the automobile has been one of the crowning achievements of mechanical engineering and a driving force in global development. Although the automobile has become an undoubted success, its growth in usage has engendered serious concerns over its relationship to and interaction with climate change and oil dependency, both serious sources of societal instability. Any further automotive developments have to include energy efficiency and reduction of greenhouse gas emissions as key performance goals.

Even if both the automotive industry and government embrace the societal imperative for energy efficient automobiles, the successful implementation of any new technologies will be critically dependent on mainstream consumer acceptance. A case in point is the number of plug-in electric vehicles (PEVs) and hybrid electric vehicles (HEVs) offered or promised to be offered by nearly every automaker today. Although these technologies offer a cleaner and more energy efficient alternative to traditional petroleum-fueled vehicles, mainstream consumer acceptance of these technologies is stymied by considerations of their premium price, limited travel range, and extended charging times, all consequences of current battery technologies.

Accordingly, a need exists for vehicle power management systems which provide increased efficiencies at a low price point. The present disclosure provides these improvements along with additional benefits.

BRIEF SUMMARY

A vehicle power management system in which an Inertial Storage and Recovery System (INSTAR) utilizes an enhanced Flywheel Energy Storage (FES) to obtain higher vehicle efficiencies. Overall vehicle efficiency is improved as the INSTAR system allows the regenerative braking energy surge to be readily stored at high efficiency on the flywheel.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

1. Introduction

An Inertial Storage and Recovery System (INSTAR) employs and enhances a Flywheel Energy Storage (FES), thus allowing for the entirety of the regenerative braking energy surge to be quickly and efficiently stored in the spinning flywheel mass. This contrasts sharply with the fraction of available energy normally recuperated with regenerative braking.

1.1. Simulation Environment

LTSpice, an open-source circuit simulation software widely used in both academia and industry, was used to calculate real-time power flow within the INSTAR system and demonstrate the expected gains in improved regenerative braking and overall vehicle range. The LTSpice model inputs are matched to the electric vehicle test platform for model verification. The motor constant, torque constant, inertia, resistance, inductance, and efficiency are provided through experimentation by the motor manufacturer. The load on the motors is experimentally determined and includes the rolling friction, load inertia, total circuit resistance, and inductance. This allows for a precise model to correctly predict system performance. Before the model can be fully validated, a FES system prototype was installed on an Electric Vehicle Testing Platform (EVTP). The simulation model was then used for further design optimization and scaling to the full-size urban vehicle.

Figure 1:
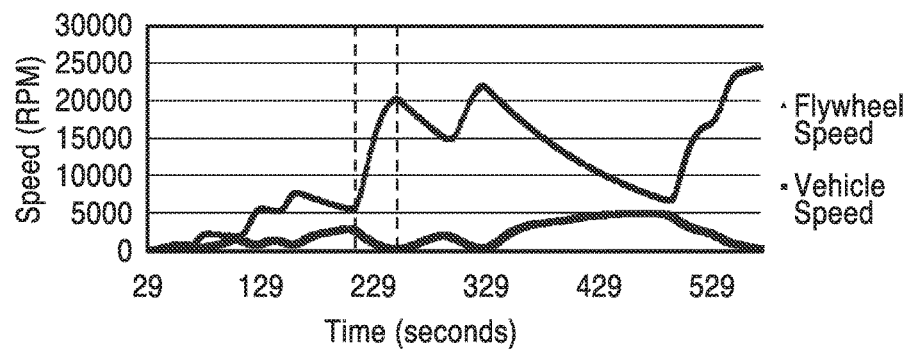
FIG. 1 is a plot of simulated vehicle deceleration in which energy is transferred to a flywheel energy system (FES) and then to the batteries, according to an embodiment of the present disclosure.

FIG. 1 depicts LTSpice simulations showing how typical vehicle decelerations from urban driving result in the transfer of energy first to the FES and subsequently to the batteries. The region of the plot outlined with dashed lines shows the vehicle slowing to a stop, causing the flywheel to spin at over 20,000 RPM, capturing the kinetic energy of the vehicle. The flywheel is subsequently decelerated, generating electricity back through the same attached motor used to accelerate it. The drop in flywheel speed after the $2^{nd}$ dashed line is this energy being fed back to the batteries. The controllability of the deceleration is the second main advantage of the INSTAR system, as it is used to recharge the batteries at a lower, more precise and conditioned rate, improving long term battery life.

Traditional regenerative braking does provide this controlled charging rate, but instead generates large energy spikes that are returned to the battery only during the few seconds of deceleration. It will be recognized that current limits are artificially put in place to safeguard the batteries from excess current, set at the maximum level before long term battery capacity is jeopardized. The excess current is thus wasted, lowering vehicle efficiency.

1.2 Description of INSTAR FES

The INSTAR system uses the flywheel to not only capture more of the available energy, but also as a mechanical charging "filter" which allows the maximum allowable charging current to be fed back to the batteries over a longer period, which is no longer limited by the short duration of the deceleration period itself.

Figure 2:
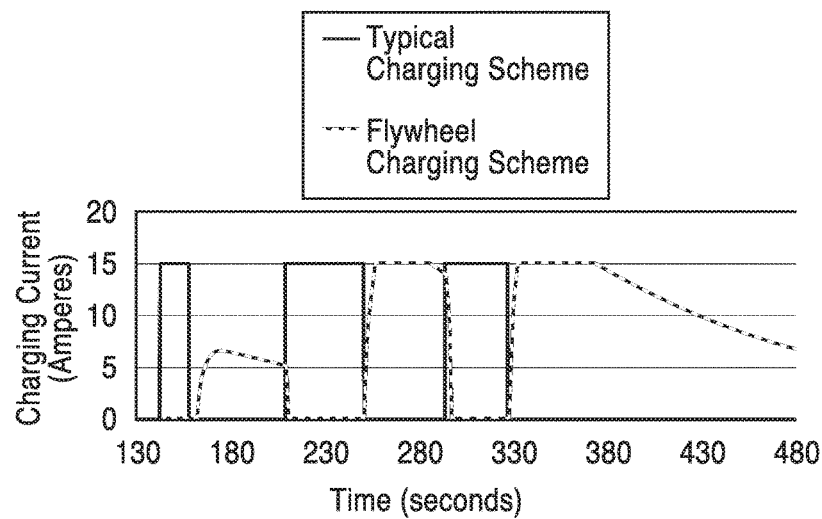
FIG. 2 is a plot comparing charging current for a typical charging scheme without a flywheel energy system (FES), with that of a flywheel based charging system, according to an embodiment of the present disclosure.

FIG. 2 illustrates a comparison between a typical charging system depicted with the solid line, and a flywheel charging system depicted in the dashed lines. The LTSpice INSTAR simulation demonstrates this excess current loss principle with the same typical urban driving profile as previously described. The first large spike normally seen by the batteries is first absorbed by the flywheel (see FIG. 2), and is replaced by a longer charge at a lower and safer current. The subsequent traditional ten (10) to fifteen (15) seconds-long charging spikes are transformed into charging periods of one hundred (1000 seconds at equal currents, returning significantly larger amounts of energy to the batteries. The frequency of stop and go in urban driving profiles naturally lead to inconsistent charging times which negatively affects battery life and energy capacity, yet the INSTAR FES system minimizes these effects on the battery system, all while recapturing significantly more energy. Simulations on the present disclosure estimate that 70% more energy is recaptured, which increases overall range by 15%.

Mechanical systems for regenerative braking have been implemented in the past, ranging from large flywheels on city buses and trains to hydraulic systems in garbage collection trucks. However, the scaling of these systems has always been a major challenge. Hydraulic systems require large pumps and heat exchangers, both of which are ill-suited to small urban vehicles. The large flywheels on buses and trains have employed magnetic bearings, high vacuum levels, and use of expensive composite materials. Although each of these elements can increase overall system efficiency: magnetic bearings reduce friction, higher vacuums reduce windage losses, and composite materials reduce weight due to their high strength-to-weight ratio. However, by analyzing urban driving patterns provided by the EPA we have determined that small urban vehicles require the FES to store regenerative braking energy for only minutes at a time. This results in each of these three advanced spindle components also adding unnecessary cost and complexity to the system. The INSTAR FES system therefore utilizes more conventional and lower cost components, resulting in only marginally lower efficiency than large scale systems, and directed to gaining significantly higher market appeal.

Figure 3:
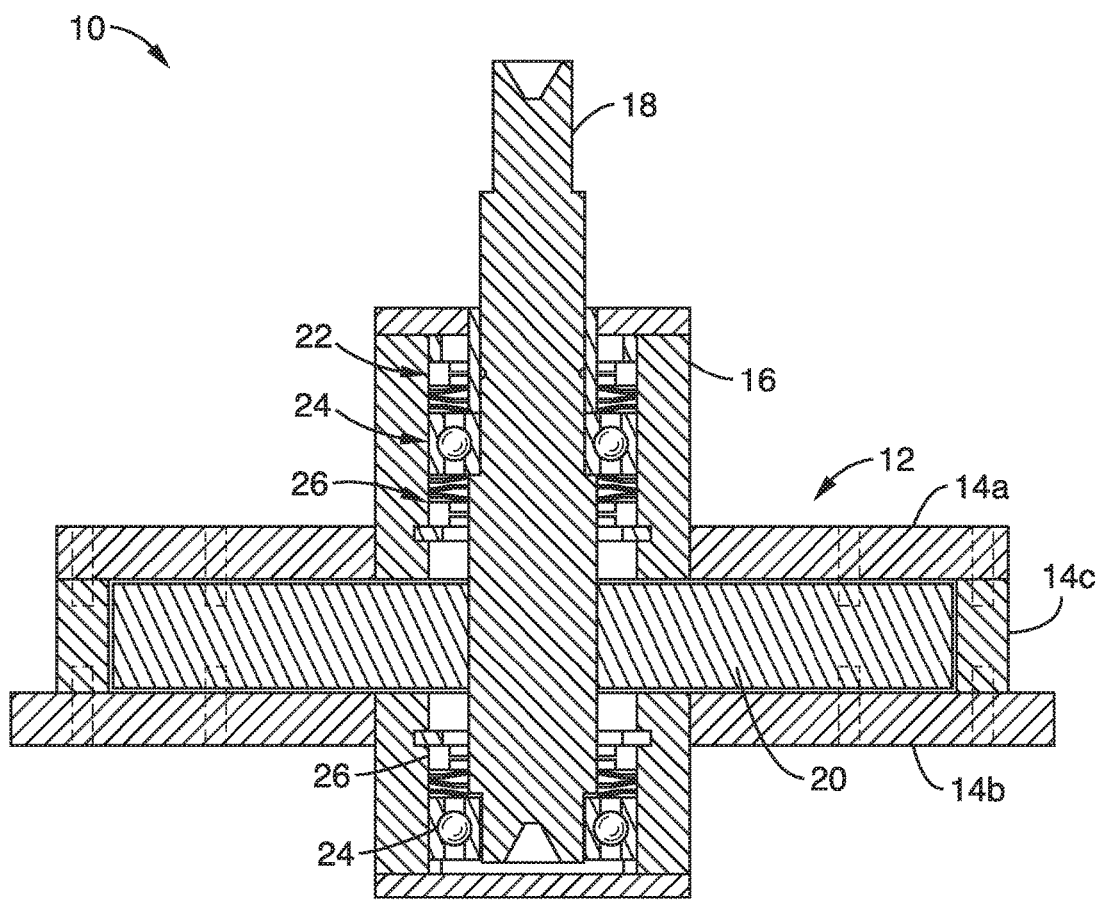
FIG. 3 is a section view of a flywheel showing spindle components, according to an embodiment of the present disclosure.

FIG. 3 illustrates an example embodiment 10 of a flywheel energy system (FES). A flywheel housing 12 is seen comprising three components, with an upper structure 14a, lower structure 14b, and intermediate structure 14c, the combination of which in this example are joined together to surround flywheel 20. An axial housing 16 is coupled to the flywheel housing 12, and surrounds mechanical input/output coupling 18 (shaft) along with mechanical bearings 24 and vacuum seals 26 which are seen surrounding shaft 18 above and below flywheel 20. In addition, the upper housing is seen with a lubricant seal 22.

The components of the FES are all chosen and designed specifically for the unique power management scheme of the INSTAR system, requiring only minutes of storage before the energy is returned to the batteries where it can again be used for driving. The high precision bearings 24 allow for low frictional losses at speed and protection against the bumping and jarring of urban driving. Two bearings 24, one above and one below the flywheel, maintain alignment and low friction. These bearings are kept cool in this embodiment through a forced oil lubrication system with each bearing having a separate circulation system powered by one small oil pump. A soft vacuum, less than five (5) PSI, is maintained in the flywheel enclosure to further reduce windage losses from air resistance and maintain high system efficiency. Teflon lip seals provide the necessary sealing between vacuum (vacuum seals 26) and lubrication (lubricant seal 22) systems at the necessary rotational speeds. By way of example and not limitation, flywheel mass 20 comprises a 17-4 PH stainless steel. This recyclable material is precipitation hardened to allow higher rotational speed compared to traditional steel due to its superior tensile strength at a low cost. This is all enclosed within the 0.5" thick aluminum safety enclosure. The FES connects to the DC brushless motor generator externally, with the shaft of the flywheel directly connected to the rotor of the motor for maximum torque transfer and efficiency. It should be appreciated that the present disclosure is not limited to using the specific flywheel design described above, but may employ various small flywheel designs without departing from the teachings of the present system.

Figure 4A:
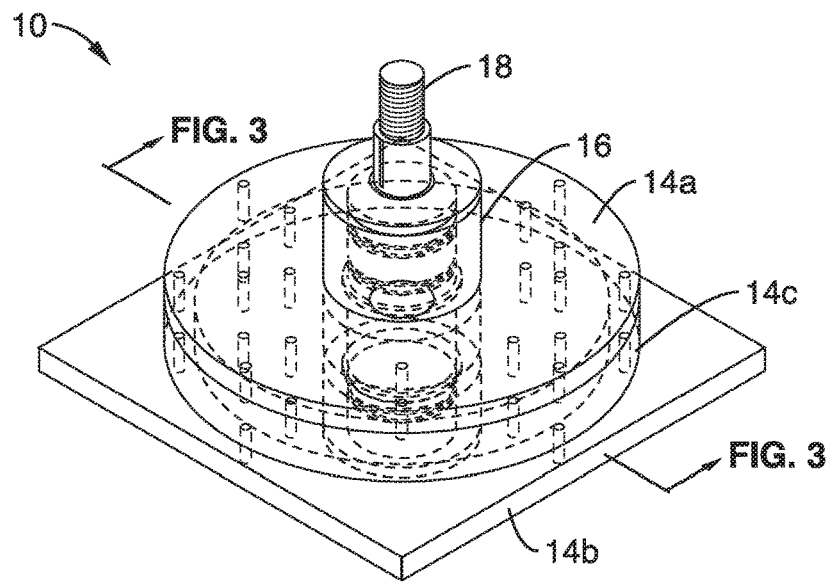
FIG. 4A and FIG. 4B are views of a flywheel energy system (FES), according to an embodiment of the present disclosure.
Figure 4B:
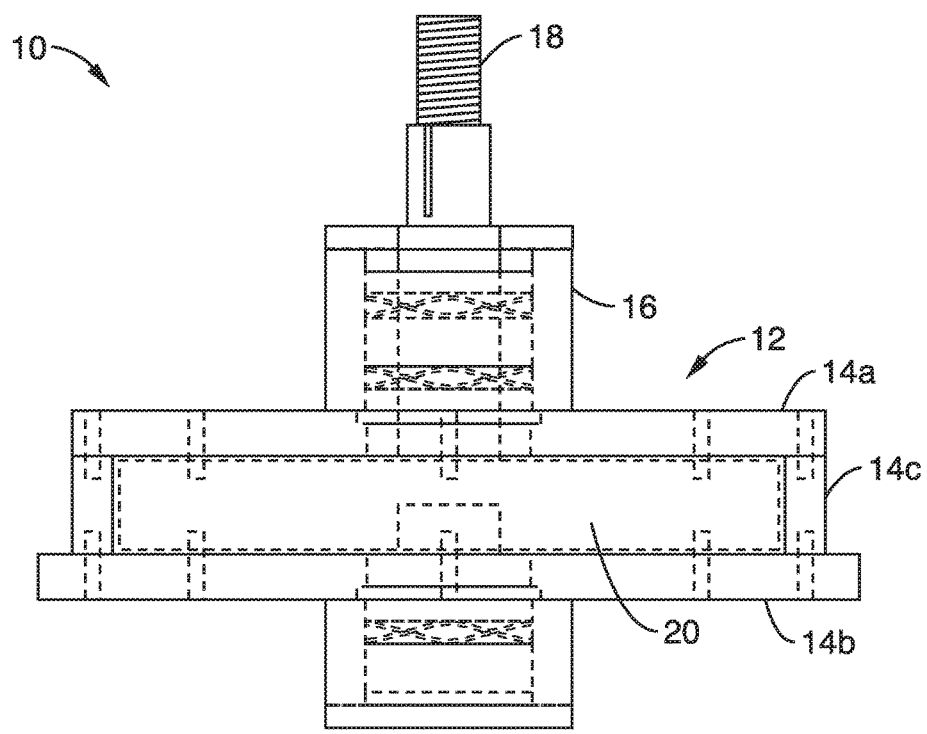

Referring also to FIG. 4A, FIG. 4B taking these design considerations into account, the first INSTAR FES prototype has been carefully designed for a small electric vehicle test platform. Computational MatLab optimization has been employed to weigh and compare design tradeoffs, maximizing efficiency, lifetime, and energy density (kWh/kg). The FES system was designed to first be capable of storing the entirety of the available braking energy, providing a lower bound on the required size and speed of the FES system. However, this must be balanced against the resulting stress on the flywheel material.

Energy Stored: $K = \frac{1}{2}I\omega^2 = \frac{1}{4}Mr^2\omega^2 = \frac{1}{4}\pi\rho t r^4 \omega^2$ Hoop Stress: $\sigma \propto \rho\, r^2 \omega^2$ where I is moment of inertia, M is flywheel mass, ρ is flywheel material density, t is flywheel thickness, and r is the radius of the flywheel.

Larger flywheel masses require slower rotational speeds, but decreases the energy density of the system. Faster speeds reduce the necessary weight of the flywheel mass, but also reduce bearing life and contribute to the hoop stress, a major concern for the more conventional flywheel mass materials. It is more efficient to increase the radius than to increase the thickness due to the relative proportionality constants. Thickness adds linearly to both the energy storage and weight, whereas the radius increases the energy storage capability with proportionality $r^4$ and the mass with $r^2$. However, the thickness does not affect the hoop stress, whereas the radius is a major factor in the magnitude of stress felt by the flywheel material. A MatLab optimization code was developed to calculate the stress and energy storage capability for a large variety of geometries, speeds, and materials. Each of these combinations affects not only the size, weight, and cost of the system, but also the expected lifetime and gyroscopic effects on the vehicle chassis and these must also be considered in the design. Initial sizing was designed for our EVTP and will be smaller than for the typical urban vehicle, but will be used for proof of concept and simulation verification. Scaling from the test platform to a typical urban vehicle will be addressed at a later time, but will rely heavily on the design of the proof of concept FES. The following figures demonstrate the overall size of the MatLab-optimized electric vehicle test platform FES, with a total FES system weight of 10 kg.

The concept of a flywheel energy storage system is simple, yet it is ideally suited for increasing the overall range and efficiency of a HEV or EV. The energy from the deceleration of the vehicle is easily and quickly absorbed into the spinning flywheel mass due to its superior charging power rating. Rotating at speeds of up to 25,000 RPM, the flywheel efficiently and temporarily stores the entirety of the regenerative braking energy before the energy is sent back from the flywheel system to the batteries. The INSTAR system has been designed from the beginning to be cost-effective, employing an inspired power management scheme to not only increase vehicle range, but also to increase long term battery capacity and life.

The expected benefits of this technology included, but are not limited to the following. (1) Development of a low-cost FES system suitable for surge power acceptance functions in a small automobile. (2) A power management scheme for safe, controlled energy transfer from the drive motors to the FES and from the FES to the batteries. (3) A complete hybrid system that will have the potential for increased fuel efficiency, improved performance, and lower costs than current HEV systems.

As a proof of concept embodiment, the electric vehicle test platform uses a go-kart base for the FES system which is driven by two 5 kW Mars Electric DC brushless motors and powered by a 72V lead acid battery pack. Lithium-Ion battery packs will eventually replace the lead acid batteries.

Figure 5:
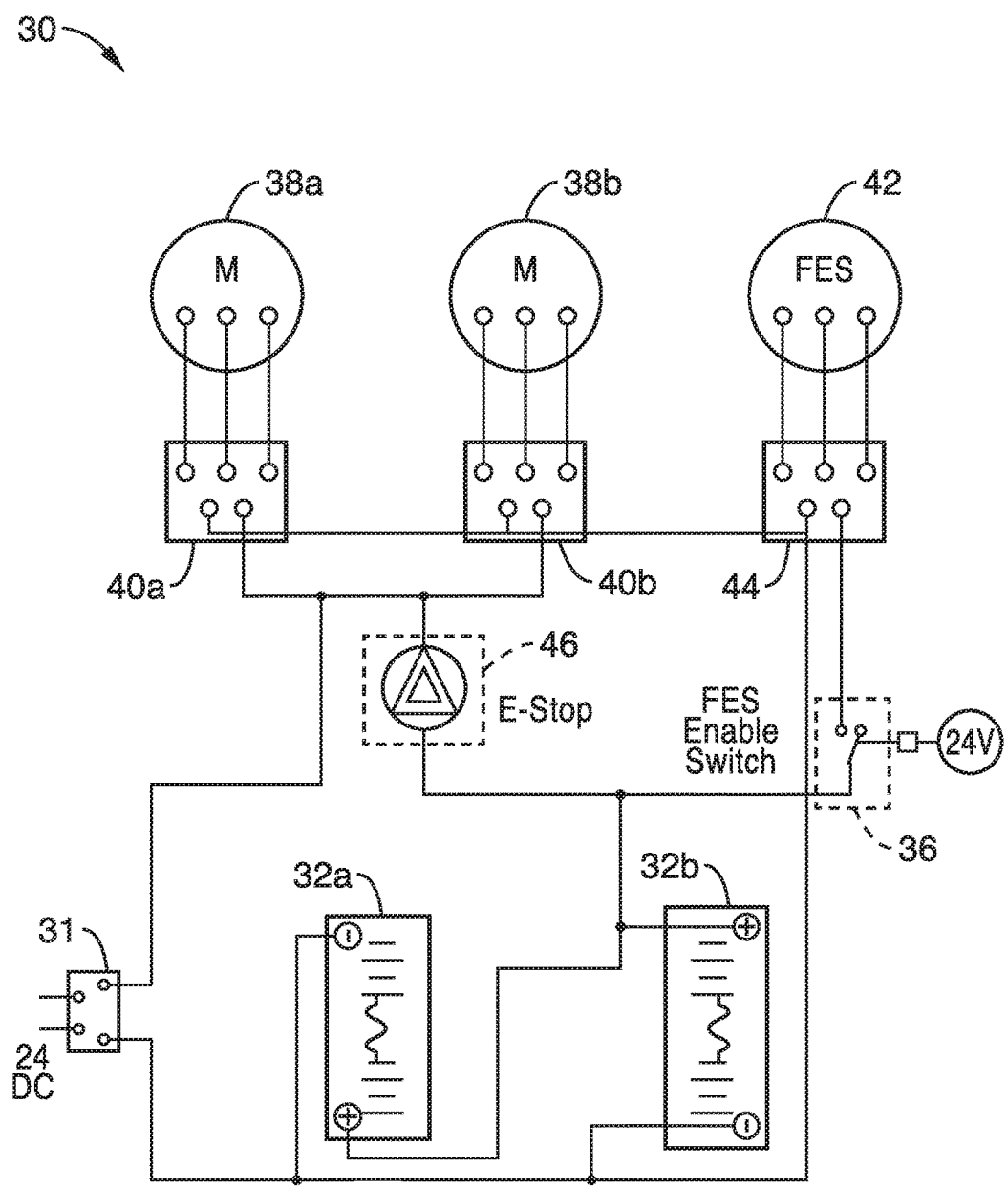
FIG. 5 is a schematic of a wiring diagram for an inertial storage and recovery system (INSTAR) utilizing a flywheel energy system (FES), according to an embodiment of the present disclosure.

FIG. 5 illustrates an example embodiment 30 of INSTAR system wiring. In the example embodiment, the flywheel (FES) and drive motors are run on a 72 V system, as supplied by the batteries. There are two (e.g., fused) battery packs, 32a and 32b, each of which supply 72 V. The vehicle can run on a single battery, but two are used to extend the range of this test vehicle. There is also a 24 V system, derived from the 72 V batteries. The 24 V system is used to supply power to the electronics, switches, and relays. Such electronics typically run at a lower voltage for safety, whereas higher voltages are used for higher power systems such as the drive motors and flywheel. Block 31 is a 72V-24V DC-DC power converter for the electronics. Block 36 provides the user the option of switching off the FES if desired for any reason, for example if there is a malfunction in the FES, and still enable the vehicle to run as a conventional system. It should be appreciated that the present disclosure is not limited to using with a specific number or type of motors, or at any specific voltages, as one of ordinary skill in the art can utilize the teachings herein toward applying this system to a wide range of hybrid and electric vehicles.

Two motors 38a, 38b are seen along with FES 42. Each of these motors, for the drive wheels and FES, are controlled by respective motor controllers 40a, 40b, 44. By way of example and not limitation, the motor controllers comprise Sevcon Gen 4 motor controllers, which are the latest models of DC brushless motor controllers and have pre-programmed regenerative braking capabilities, wherein upon being controlled to provide braking they operate in a generator mode and output a current. An emergency stop switch 46 is also seen. which comprises a manually operated emergency power-off switch. It disconnects the batteries from the drive motors in case of serious malfunction anywhere, for example if the motors short-out and catch fire. All high-power electrical systems preferably are configured with such a switch, either automatic or manually operated.

Figure 6:
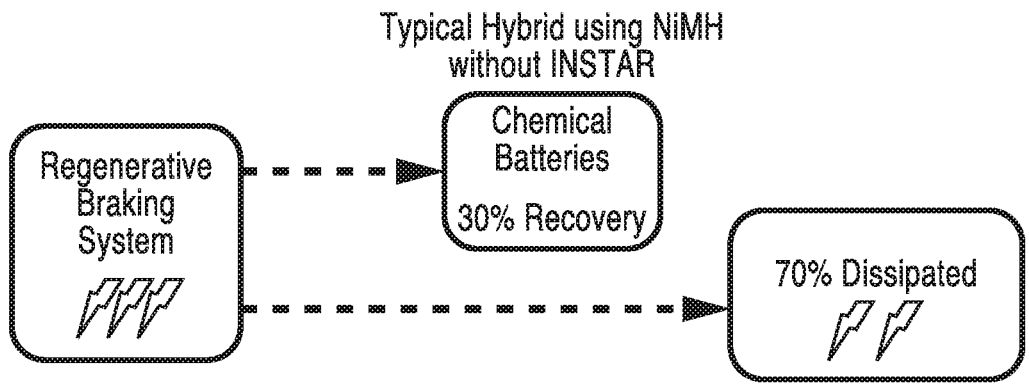
FIG. 6 is a block diagram of typical hybrid or fully-electric vehicle system.

FIG. 6 shows a block diagram of typical hybrid electric vehicle system without INSTAR. In this diagram it is readily seen that only 30% of the output current from the regenerative braking of the motor controller is recovered by storing it in the chemical batteries, while 70% of that current is dissipated for reasons explained in a previous section.

Figure 7:
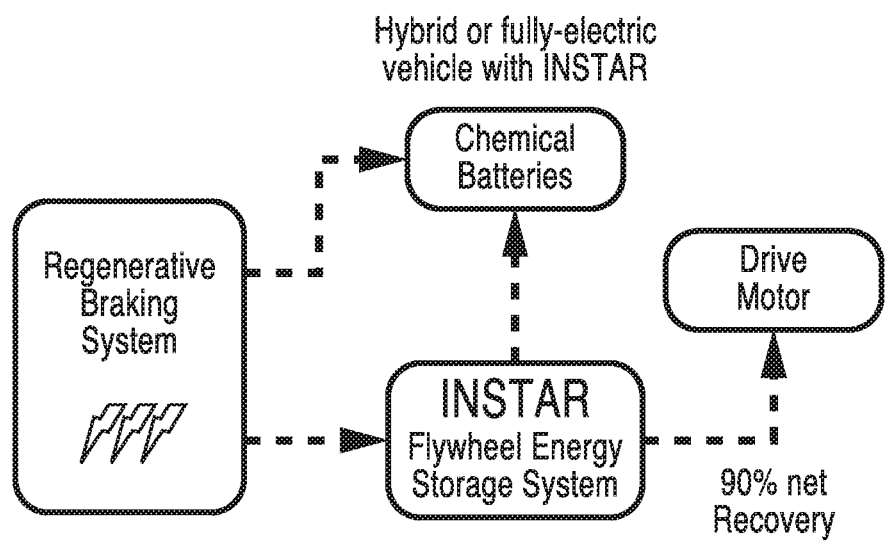
FIG. 7 is a block diagram of a hybrid or fully-electric vehicle with an inertial storage and recovery system (INSTAR) utilizing a flywheel energy system (FES), according to an embodiment of the present disclosure.

FIG. 7 shows a block diagram of hybrid or fully-electric vehicle with INSTAR. In this diagram the output current from regenerative braking is seen split between the battery system and the INSTAR FES. It will be appreciated that the INSTAR FES spins up its flywheel in response to commands to its motor controller and the available current, thus it can immediately use current from the regenerative braking to spin up the flywheel. This flywheel can be slowed with regenerative braking to generate a charging current to the chemical battery system, and for outputting to the drive motor as desired. By using the FES as an intermediary storage under INSTAR, there is a 90% net recovery of the regenerative braking power.

Figure 8:
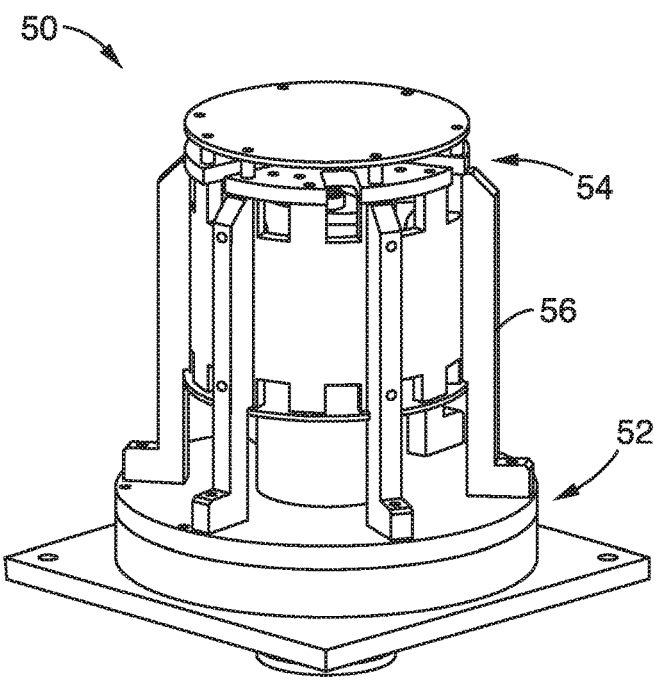
FIG. 8 is a perspective view of a flywheel with brushless motor and safety enclosure for an inertial storage and recovery system (INSTAR), according to an embodiment of the present disclosure.

FIG. 8 is an example embodiment 50 of INSTAR FES showing flywheel section 52, brushless motor 54, and safety enclosure 56.

Figure 9:
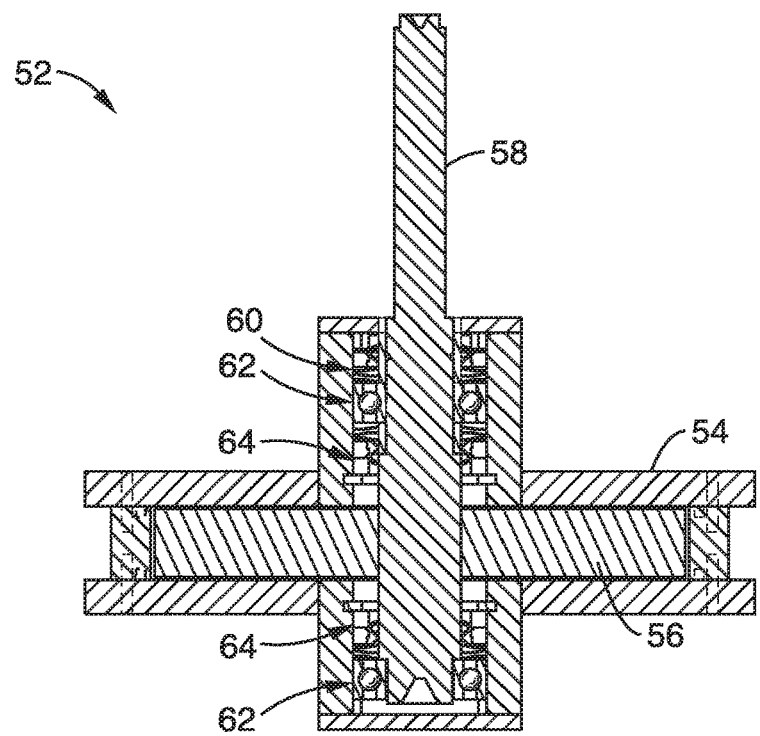
FIG. 9 is a cross section view showing internal components of an inertial storage and recovery system (INSTAR), according to an embodiment of the present disclosure.

FIG. 9 depicts the flywheel section 52 of the INSTAR FES seen in FIG. 8, with a flywheel housing 54 surrounding flywheel 56 and shaft 58. Shaft 58 is seen surrounded by mechanical bearings 62, vacuum seals 64 and a lubrication seal 60.

Figure 10:
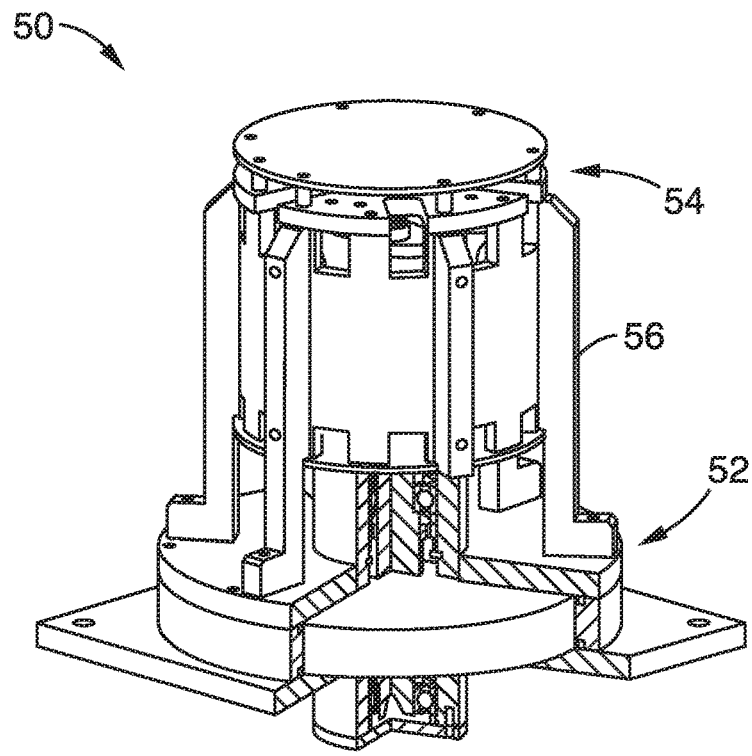
FIG. 10 is a cutaway view of FIG. 9 showing the flywheel.

FIG. 10 depicts a cutaway which shows the flywheel from FIG. 9.

Figure 11:
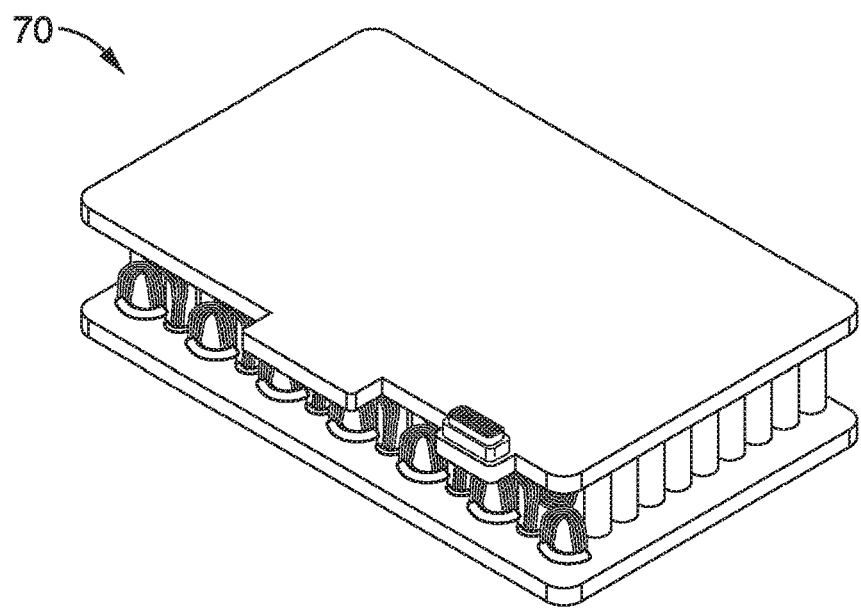
FIG. 11 is a perspective view of a chemical energy storage device (battery pack), according to an embodiment of the present disclosure.

FIG. 11 illustrates an example embodiment of a chemical energy storage device (battery pack), for example as may be fabricated using a plurality of Li-ion battery cells.

Figure 12:
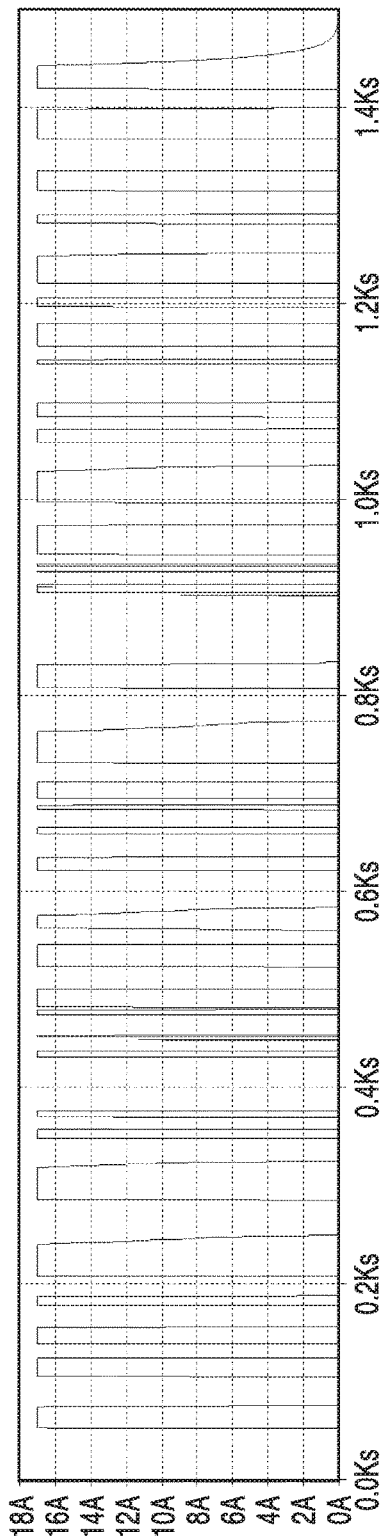
FIG. 12 is a plot of a charging profile without the disclosed inertial storage and recovery system (INSTAR).

FIG. 12 depicts an example of a charging profile without INSTAR. It can be seen in the figure that the battery is charging across many short spiky intervals, in many of which the available current would exceed the capability of the battery to receive it.

Figure 13:
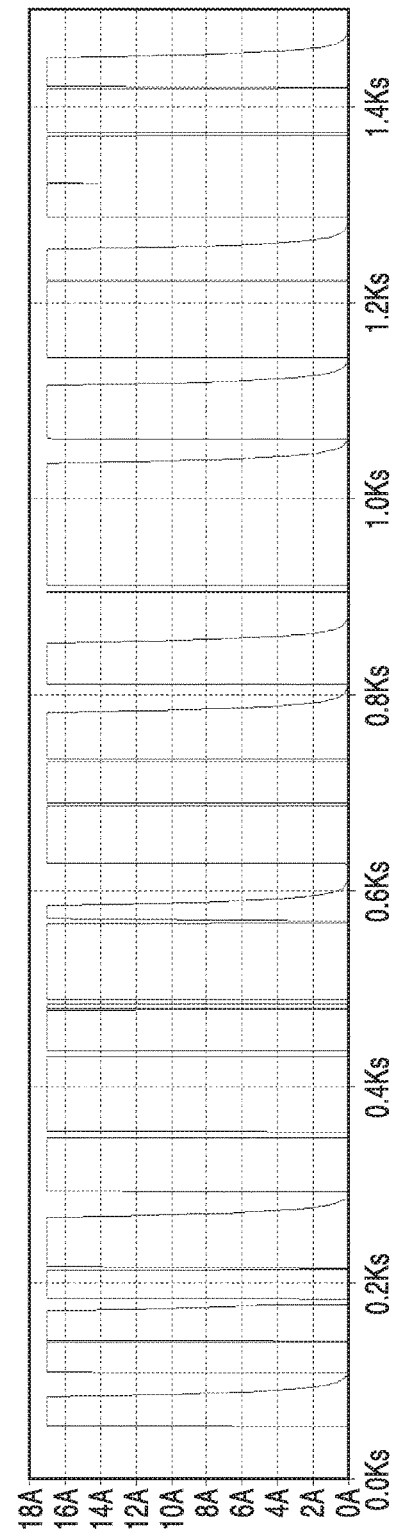
FIG. 13 is a plot of a charging profile with inertial storage and recovery system (INSTAR), according to an embodiment of the present disclosure.

FIG. 13 depicts an example of a charging profile with INSTAR. In this charging profile relatively long charging intervals are seen as the FES is controlled so that a proper level of current is provided to charge the batteries.

Figure 14:
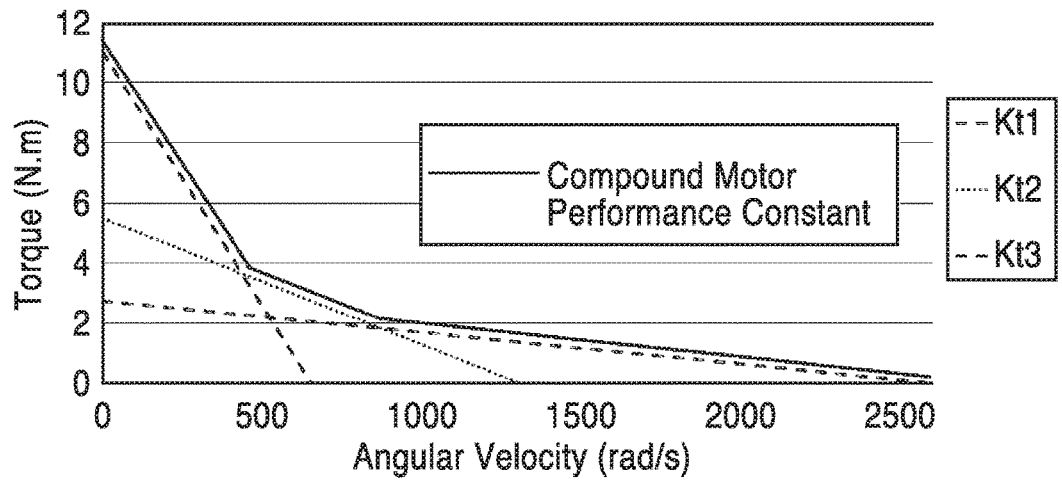
FIG. 14 is a plot of variable winding motor torque speed curve), according to an embodiment of the present disclosure.

FIG. 14 is an example of a variable winding motor torque speed curve. It should be appreciated that it is possible to connect the coils in the motor/generator of the FES in different ways to yield different torque constants, which are equivalent to back-electro-motive-force (BEMF) constants. The switching can be performed electronically, although this has not yet been tested on the present prototype set-up. The advantage is that a low BEMF connection can be used to drive the FES to higher speeds, whereas a high BEMF produces higher voltages that are advantageous for charging the batteries more efficiently.

It will be appreciated that the widespread adoption of hybrid and fully-electric vehicles can provide a key to societies transition away from fossil fuel dependence. This transition, however, has been slow; perhaps as the relatively limited fuel efficiency gains have not justified the increased costs. Regenerative braking, the recovery of energy normally lost during deceleration, improves the overall vehicle efficiency, but the charging rates of current chemical batteries limit the amount of energy recovered.

2. INSTAR Power Flow Controller 2.1 Closed Loop Controller

Figure 15:
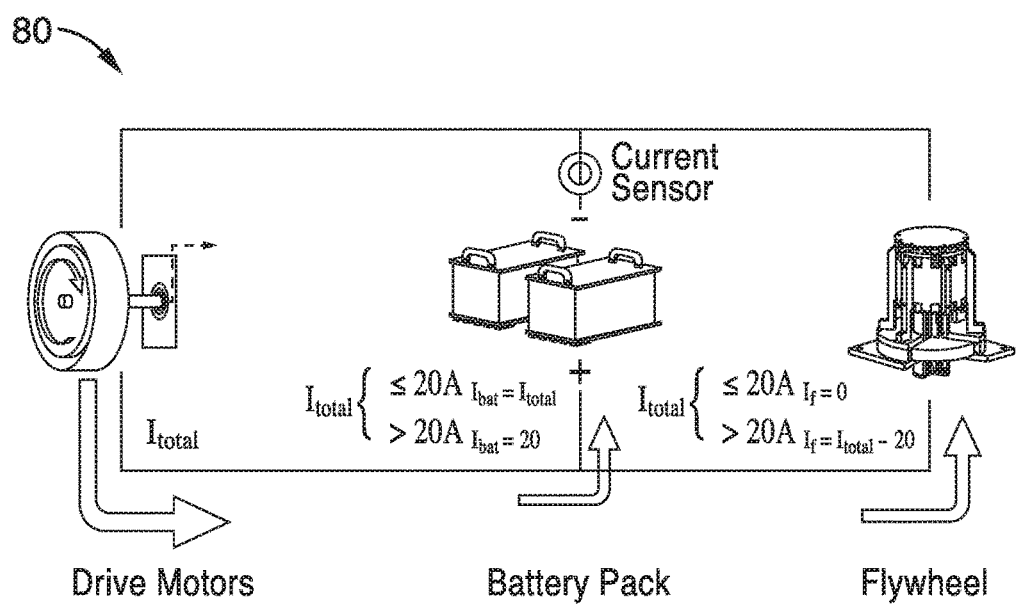
FIG. 15 is a block diagram of a regenerative braking scenario on a closed-loop controller, according to an embodiment of the present disclosure.

FIG. 15 illustrates an embodiment of the INSTAR system with drive motors, flywheel, and batteries with an associated current sensor. One way of describing the main operating principle of the INSTAR system is to use the flywheel to siphon current away from the battery packs during braking. Naturally, a closed loop controller using the current sensor monitoring the current to the battery pack as feedback is a natural choice for an initial flywheel throttle controller when the operating principle is described in this manner. This sensor, labeled as current sensor in FIG. 15, reads only the net current flowing to the pack based on its location in the wiring of the kart.

If the flywheel is consuming the exact amount of current that the traction motors are generating during regenerative braking then the battery pack current sensor reads zero amps. If the flywheel is providing the exact amount of current the motors are using to accelerate the vehicle, again, this current sensor reads zero amps. If the vehicle is stationary after a braking event and the flywheel is spinning, storing its absorbed energy, any current it generates during flywheel regenerative braking goes directly to the battery packs and this current sensor reads precisely this value. The main idea is that this simple setup allows for the current sensor to be used as the necessary feedback in a simple, closed loop controller.

This current sensor, more importantly, can be used to not just have the flywheel absorb all the regenerative braking current as just described, but it can be used to have the flywheel absorb a precisely controlled amount that is easily changed. This allows the battery pack to absorb its maximum safe charge current, which varies with both size and battery chemistry, and reduce the necessary size of the flywheel as it needs to store less energy. This is an ideal feature for a future controller as it has many positive benefits on the mechanical design and overall attractiveness of the system, including: lower costs, less flywheel mass, and smaller FES package volumes.

In regard to FIG. 15 the battery is shown with a battery charge limit of 20 Amps (C/2). In this scenario, the total current generated by the traction motors during regenerative braking is $I_{total}$ and can be upwards of 100 Amps. Any braking event that generates 20 Amps or less should be completely absorbed by the battery pack. Any event larger than 20 Amps, or even any portion of an event larger than 20 Amps, should activate the flywheel throttle to have the flywheel motor accelerate and draw current away from the battery pack, using it instead to spin up the disk.

This scenario seems fitting for a simple proportional-integral (PI) controller, using the current sensor to track the controller process variable, $I_{Battery}$. The flywheel throttle is manipulated to have the flywheel motor siphon off any current beyond the 20 Amp set point. The error, here the difference between the current read by the current sensor and the 20 Amp set point, is used to calculate the throttle signal using the standard definition of a PI controller, shown in equation (1), and which is summarized in Table 2.

$$\text{Throttle}_{flywheel} = K_p e(t) + K_i \int_0^t e(\tau) d\tau \quad (1)$$

This controller was implemented in LabView and tested on the go-kart test platform. This test used a zero current set point for initial testing and only calculated the error when the brake pedal read a non-zero signal so as not to confuse the PI controller with the large currents seen during acceleration. A full PID controller, using the differential term, did not seem feasible due to the high-frequency variation in the current sensor signal. While the signal to noise ratio (SNR) is well above 10, the noise caused the differential term to change sign and destabilize the controller. Including this term was abandoned as it did not appear to be worth the effort.

Figure 16A:
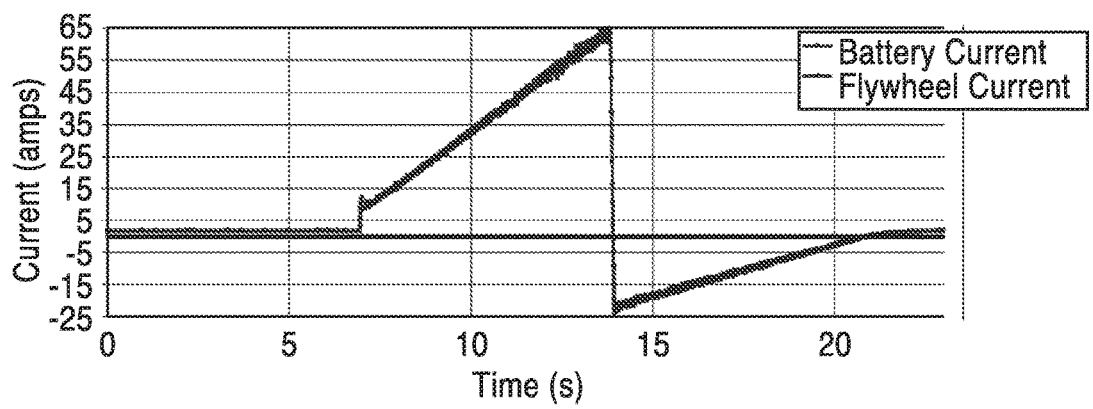
FIG. 16A and FIG. 16B are plots of current during a braking event without using the inertial storage and recovery system (INSTAR) of the present disclosure.
Figure 16B:
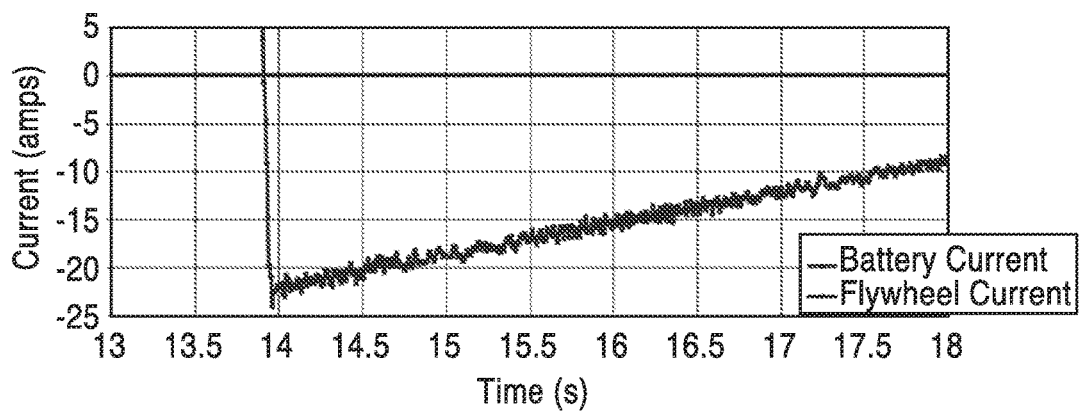

FIG. 16A and FIG. 16B illustrate system currents during a single braking event. FIG. 16A depicts current for this single braking event without the INSTAR system (the control event), while FIG. 16B provides a magnified plot of peak charging current. This control event provides context so the effects of the controller can easily be determined.

Figure 17A:
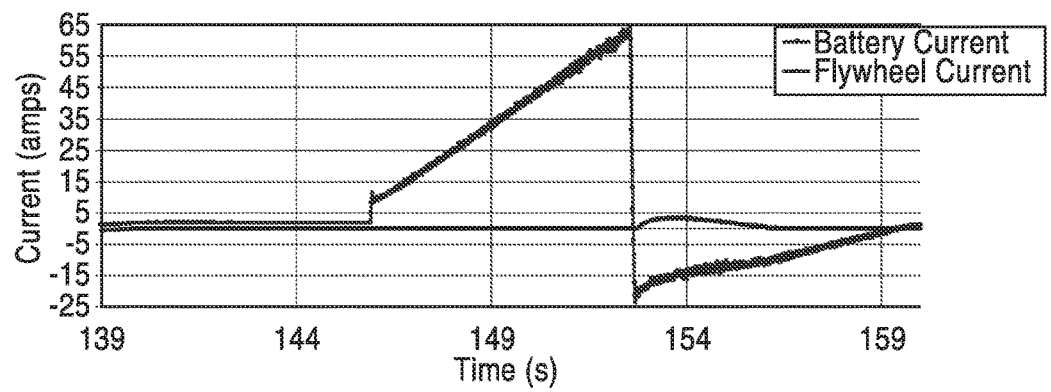
FIG. 17A and FIG. 17B are plots of current during a braking event using the inertial storage and recovery system (INSTAR), according to an embodiment of the present disclosure.
Figure 17B:
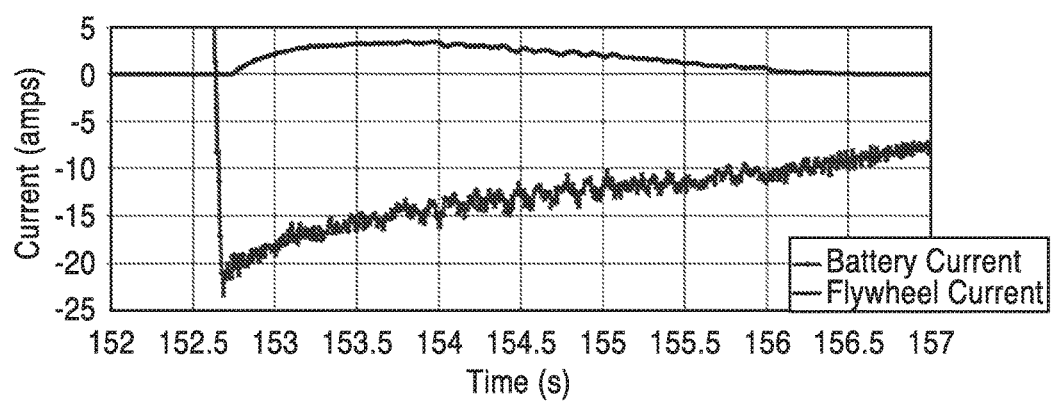

FIG. 17A and FIG. 17B illustrate system currents during the same braking event as seen above, but this is using the INSTAR system. In this braking event, the PI controller is enabled and the flywheel is allowed to accelerate to bring the current back towards the zero amp set point. Although the controller was overall able to successfully reduce the error by manipulating the flywheel throttle as planned, it was found during testing that the flywheel was slow to react using this controller. As seen in FIG. 17A at time approximately 146 seconds, the current very quickly ramps up to its peak charging current value. This means that the PI error very quickly grows from nothing to its largest value. While this results in a large resultant flywheel throttle signal, the charging current peak fully develops before this throttle signal is both communicated to the flywheel motor controller and enacted by the flywheel motor controller. This time delay is commonly seen with reactive, feedback controllers. In FIG. 17B charge current is seen in a magnified plot at the end of the braking.

Figure 18:
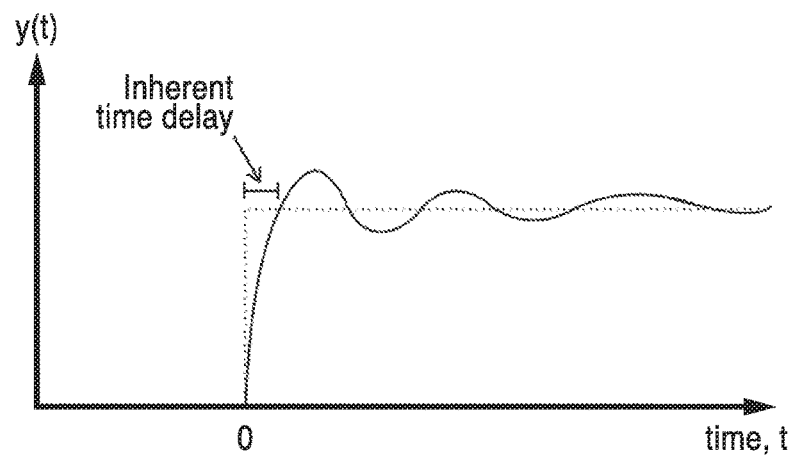
FIG. 18 is a plot of a typical (fictional) step-response for a proportional-integral (PI) controller.

FIG. 18 depicts a typical (fictional) step-response for a PI controller to reinforce this point. It is inherently necessary to wait for an error to develop in order to generate the controller response.

This time delay can be problematic for the INSTAR system. One of the major goals of the system is to have the flywheel siphon current away from the battery pack so that it does not see large charging currents. Since those currents happen at the first initiation of the braking event, the flywheel must be able to react quickly, before this peak develops. As seen in FIG. 17A, the time delay in the flywheel response allows the maximum value of the battery charge current to remain unaffected. While it stays at, or near, this value for a shorter amount of time, it is still an insufficient controller due to the importance of avoiding this peak battery charging current altogether.

This behavior was seen across a wide range of values of $K_p$ and $K_i$, even for those large enough to destabilize the system. Many tests were run with various values of $K_p$ and $K_i$. The data in FIG. 17A, FIG. 17B was merely chosen to represent the findings of this controller development process.

This seemingly unavoidable time delay was the motivation for developing the open loop controller described in the next section. It should be noted, however, that the closed loop controller showed promise for keeping the current at a desired level later in the braking event. It seems quite plausible that this controller is implemented as part of a larger, more complex controller that uses a different control method with better response at the initiation of the braking event, for example switching between open loop and closed loop regimes.

2.2. Open Loop Controller

The design goals of the open loop controller are primarily the following. (1) The controller decisions must rely primarily on information prior to the braking event so that the flywheel motor control has sufficient time to react and absorb peak regenerative braking charging current with the flywheel rather than with the battery pack. (2) The controller should be robust and generalized, capable of maintaining accurate current control over a broad range of vehicle speeds, flywheel speeds, and braking torque requests. (3) The predicted regenerative braking current should accurately match the actual current that the flywheel will be required to absorb during regenerative braking. (4) The controller should provide an accurate flywheel throttle signal that absorbs precisely the amount of predicted current.

It is important that implementation is not considered limited to the size of the INSTAR test go-kart or require information solely available on the INSTAR test go-kart, but that it is understood to be generalized and scaled to a broad range of vehicles. This section describes both the form of the open loop controller and the system model it is based on so that it can be better translated on to other systems and/or integrated into more complex controllers.

The open loop controller has initially been designed to zero out the charging current to the battery pack during regenerative braking and absorb the entirety of this energy with the flywheel. This is not ideal, nor is it a requirement for the open loop controller to function. The battery pack can, and should, absorb energy to minimize the required flywheel size and speed. It is possible to include this in the controller algorithm and should be included in future iterations. However, this scenario serves as a good starting point for the development of an INSTAR controller capable of protecting the chemical battery pack from high charging currents. With this in mind, the governing equation for the initial open loop controller during regenerative braking is:

$$I_{Vehicle\_Regen} = I_{Flywheel\_Absorbed} \quad (2)$$

During regenerative braking, both sides of the system, current-generating vehicle traction motors and the current-absorbing flywheel motor, can simply be thought of as electric motors with attached inertial masses. The behavior for this type of simplified system is both well-understood and straightforward. This system model can be used to predict how much current will be generated by the wheels during a braking event and also what throttle signal the flywheel requires in order to absorb just that same amount. Due to its simplicity, the controller can be run in real-time on the go-kart computer process (e.g., cRIO processor, or other computer processor as desired).

2.2.a Current Generated on Regenerative Braking ($I_{Vehicle,Regen}$)

The controller uses two values, in particular the brake pedal position and the wheel speed, to calculate how much current will be generate during regenerative braking. Both of these values are read from the vehicle in real-time.

The brake pedal position is used since this signal eventually becomes the requested braking torque. It is available in all vehicles and, more importantly, it is available before the charging current develops and is sent to the battery pack. This is the major benefit of the open loop controller compared to the PI, closed loop controller that required the charging current to already be flowing before the flywheel throttle signal could be calculated, transmitted, and employed. Using the brake pedal signal means that the current calculated by this controller is a prediction, as the current has not been generated by the traction motors yet. This fulfills the first design goal of prediction.

There is a major contribution to the overall current used/generated by the motor from the fact that the wheels are spinning. The applied torque is not being used to keep the wheels in place, where power would remain constant, but is used to accelerate them. This acceleration requires more power at higher speeds. Determining how much more current is required at higher speeds can be determined by modeling the system using conservation of energy and power.

Beginning with the kinetic energy of the wheels, where the wheel moment of inertia J includes the vehicle and driver inertial contributions:

$$E = \frac{1}{2} J \cdot \omega^2$$

$$\text{Power} = \frac{dE}{dt} = J \cdot \omega \cdot \frac{d\omega}{dt} = J \cdot \omega \cdot \alpha \quad (3)$$

$$\text{Torque} = J \cdot \alpha$$

$$\text{Power} = \omega \cdot \text{Torque}$$

$$\text{Power} = I \cdot V$$

$$\therefore \omega \cdot \text{Torque} = I \cdot V \quad (4)$$

$$\therefore I = I_{rotational} = \frac{\omega \cdot \text{Torque}}{V} \quad (5)$$

$$\text{Substituting } A = \frac{1}{V}$$

$$I_{rotational} = A \cdot (\omega \cdot \text{Torque}) \quad (6)$$

Eq. (3) shows that higher speeds result in the vehicle needing to absorb higher power levels. In regenerative braking $\propto \omega_{wheel}$, as the gear ratio must be taken into account, and higher vehicle speeds will result in higher regenerative braking current that the battery pack and/or flywheel will need to absorb. $I_{rotational}$ is inversely proportional to the voltage, which does vary over time. However, for the purposes of this initial implementation it was kept constant at the nominal 80V battery pack voltage as it is generally between 70 and 84 volts during testing.

In a DC brushless motor, the braking torque provided by the motor is linearly proportional to the current that will be generated using the torque constant of the motor $$\left( K_t \text{ in} \left[ \frac{N \cdot m}{\text{Amp}} \right] \right).$$

$$I_{torque} = \frac{\text{Torque Requested}}{K_t} \quad (7)$$

Higher torque requests provide proportionally less current to the batteries during braking due to conductive losses. The higher current generated by the higher torques result in larger currents circulating in the motor windings. Since the dissipated power is proportional to the current, it is also proportional to the torque request.

$$P_{resistive} = I_{torque}^2 \cdot R$$

$$P_{resistive} = \left( \frac{\text{Torque Requested}}{K_t} \right)^2 \cdot R$$

This power is subtracted from the power that needs to be dissipated from the wheels during braking. The net result is that proportionally less current ends up charging the battery pack and this term becomes negative in the overall controller algorithm. While it is proportional to the square of the requested torque, this term is smaller than the contribution from $I_{rotational}$ and a simple linear relationship still provided an accurate prediction of the overall current generation.

$$\therefore I_{torque} = -B \cdot \text{Torque Requested} \quad (8)$$

The last contributor current generation prediction for the open loop controller deals with INSTAR motor efficiency. The motor controllers are a torque-based system, focused on controlling the current draw and current generation required to match the torque levels requested by the vehicle driver. The motor controllers are not directly concerned with how much current is drawn from the battery packs, but how much is actually flowing through the motor windings. The INSTAR controller, however, is directly concerned with how much current the motor controllers are pulling from the battery pack rather than flowing through the windings. The reason these two are not identical is because electric motors, like any other system, are not 100% efficient at converting energy from one form to another.

During acceleration, the electrical power is used to create the mechanical power output. During regenerative braking there is a mechanical power in that is used to drive and electrical power output.

The DC brushless traction motors and DC brushless flywheel motor all exhibit motor efficiency that increases with speed. At low speeds, less energy is converted into useful energy, which is true in both energy flow direction.

Figure 19:
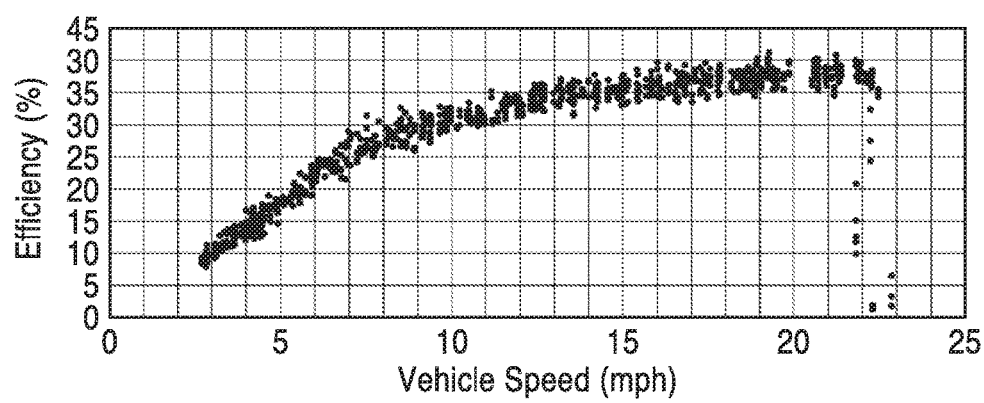
FIG. 19 is a plot of efficiency during regenerative braking.

FIG. 19 depicts efficiency during regenerative braking, showing efficiency in relation to vehicle speed.

While motors are essentially energy conversion machines and are better analyzed using energy and power balances, this efficiency concept can still be thought of in terms of current. The motor needs to supply $[I_{rotational} + I_{torque}]$ after the efficiency loss is taken into account as it is this net current that provides the torque that the motor controller is supplying. The INSTAR open loop controller compensates for this efficiency loss by adding an additional term to include this dissipated current that the battery pack or motor still provided (depending on power flow direction), but was never turned into useful work to turn the wheels or charge the battery. This extra current contribution decreases with speed as the motor becomes more efficient and less is lost. During regenerative braking, this results in more current being available to recharge the battery so the sign on this term is positive.

$$I_{efficiency\ loss} = C \cdot \omega_{wheel} \tag{9}$$

Combining each of these three discussed contributing factors results in the following.

$$I_{vehicle,regen} = I_{rotational} + I_{torque} + I_{efficiency\ loss} \tag{10}$$

$$I_{vehicle,regen} = A \cdot (\text{Torque}_{Brake,Requested} \cdot \omega_{wheel}) - B \cdot \text{Torque}_{Brake,Requested} + C \cdot \omega_{wheel} \tag{11}$$

In theory the battery voltage, torque constant, and speed-efficiency profile should be known and hence A, B, and C should be known. In practice, however, it was found that it was more useful to vary A and B in order to tune the overall controller algorithm to better match the measured current values. These values were tuned using a driving profile tested on the go-kart. The main point to emphasize here is that this driving profile was deliberately designed to ensure that the open loop controller performs well over a wide range of braking scenarios and fulfill the second design goal of robustness.

Figure 20A:
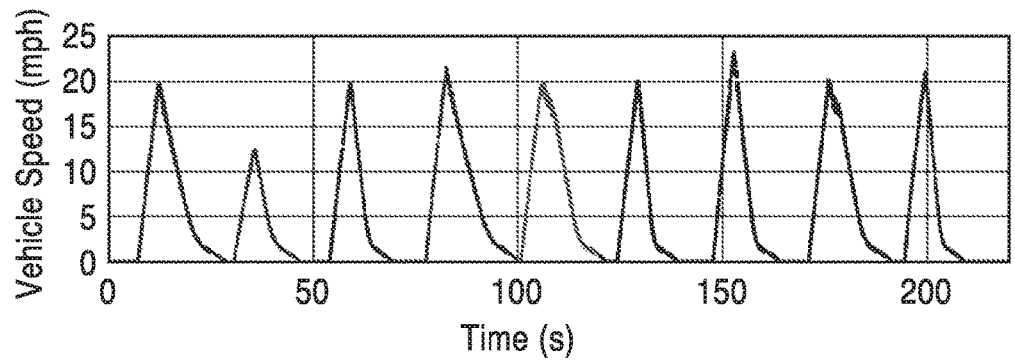
FIG. 20A and FIG. 20B are plots of vehicle speed and braking signals, respectively, during a driving cycle.
Figure 20B:
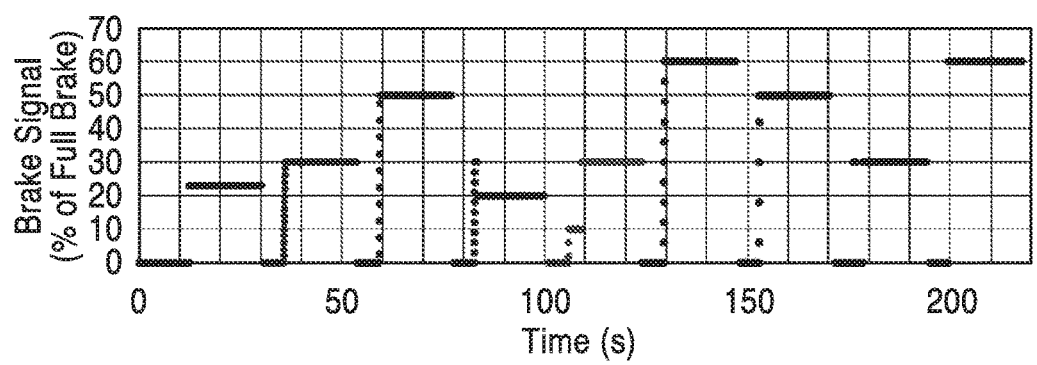

FIG. 20A and FIG. 20B illustrate vehicle speed and braking signal over the course of the test, with FIG. 20A illustrating the vehicle speed profile, while FIG. 20B illustrates braking signals during this driving profile.

Figure 21:
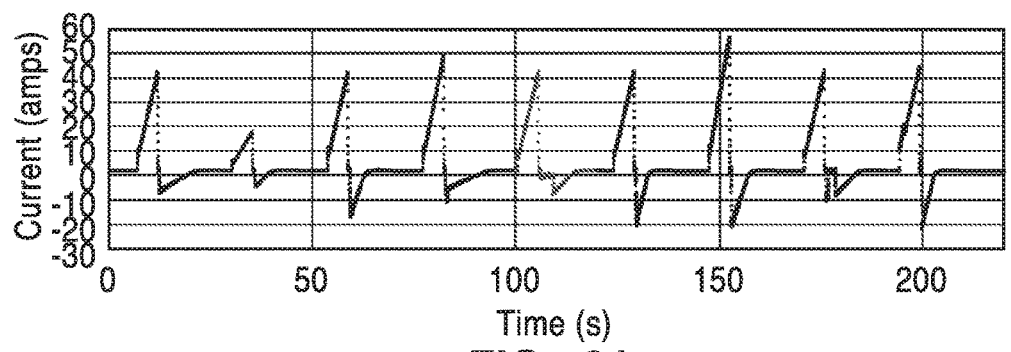
FIG. 21 is a plot of battery current during the driving cycles seen in FIG. 20A and FIG. 20B, without the aid of the inertial storage and recovery system (INSTAR).

FIG. 21 illustrates actual current that the battery pack sees during the driving cycles seen in FIG. 20A and FIG. 20B when the flywheel is disconnected.

The open loop controller uses the same sensors that collect the data in FIG. 20A and FIG. 20B, and in real-time forms its prediction on what current the battery pack will see.

Figure 22:
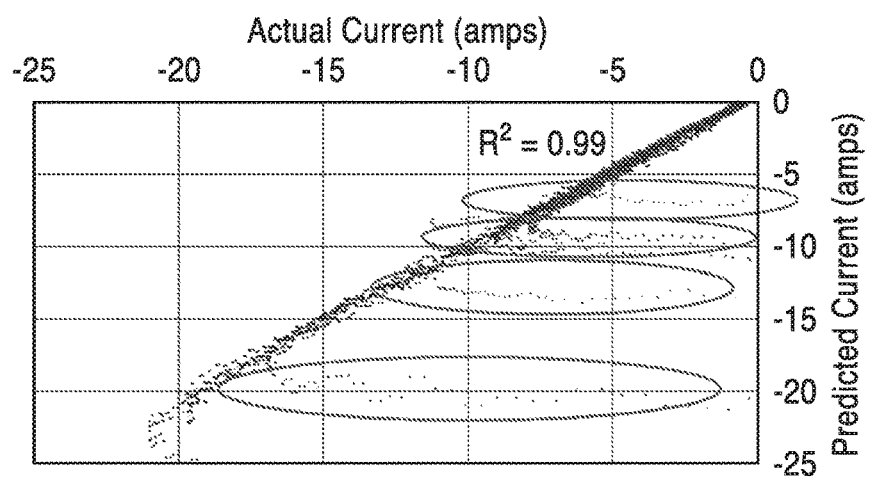
FIG. 22 is a graph of actual current and predicted current, in which horizontal stray lines are highlighted.

FIG. 22 depicts actual current and predicted current plotted against one another across a number of regenerative braking events. From this graph it should be obvious that the prediction very closely matches the actual current and that it generalizes over all of the braking events quite well. No matter the initial speed nor magnitude of the braking event, the controller is able to generalize the braking event and form an accurate prediction of the regenerative braking current using just the brake signal and the wheel speed. This fulfills the third design goal of regenerative braking current accuracy.

One thing to note in FIG. 22 is the presence of stray horizontal lines, groups of which are circled for highlighting them. These stray horizontal lines are a result of the open loop controller being a prediction. As soon as the braking event is initiated, the open loop controller immediately calculates what current will be generated. However, since it is using the same signal that actually initiates the actual event, this prediction precedes the regenerative braking current. These horizontal lines are from the start of the braking event where the current quickly ramps up to the peak value.

Figure 23:
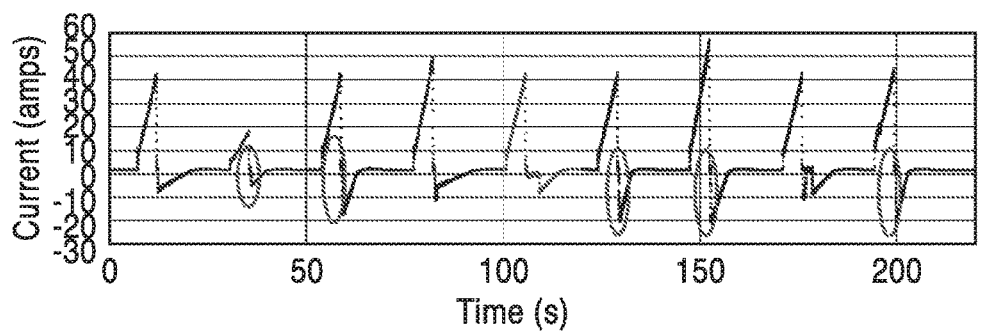
FIG. 23 is a plot of battery current during a driving cycle which current spikes are highlighted showing stray data points.

FIG. 23 depicts battery current during a driving cycle which highlights (circles) the same events as depicted by the stray horizontal lines in FIG. 22. While it appears that this in an inaccuracy of the open loop controller, and it technically is, this is also a benefit of the controller. It accurately predicts the end value of this ramp up, which is the most important value, and has this prediction before the current is actually generated. This allows the flywheel to start absorbing current and reduce the size of the peak charging current seen by the battery pack.

2.2.b Current Absorbed by the Flywheel ($I_{Flywheel,Absorbed}$)

In a similar manner to accelerator pedals in traditional internal-combustion engine (ICE) vehicles, many electric motor controllers are configured to respond to torque commands. It is then necessary for the INSTAR controller to be able to translate the current that the flywheel is required to absorb (in amps) into a CAN throttle signal for the flywheel motor controller (in Newton-meters). This allows the INSTAR controller to essentially operate the motor controller as a current sink or current source. This feature is not only useful for the open loop controller, but can be used with any INSTAR controller that directly calculates the required flywheel absorption current which can be implemented with an off-the-shelf motor controller operating in torque mode. This can potentially negate the need for a custom motor controller and bring down costs.

In order to accomplish the above, the open loop controller should be able to correlate the throttle signal to the precise amount of current that will be consumed by the motor. This ends up being similar to the current generation prediction during regenerative braking, but with a few key differences due to the reversal in the current flow direction during acceleration when compared to during regenerative braking. Much like in Eq. (10) there are again three main terms.

$$I_{Flywheel,Absorbed} = I_{rotational} + I_{torque} + I_{efficiency\ loss} \tag{12}$$

Just as with current generation prediction, the $I_{rotational}$ term is from the power dissipation during braking and again is linear with both the torque and wheel speed. In this situation, however, it is the acceleration torque rather than the braking torque.

Following the same derivation as for Eq. (6):

$$I_{rotational} = D \cdot (\omega \cdot \text{Torque}) \tag{13}$$

The second contribution, $I_{torque}$, is from the current required to generate the acceleration torque. In a DC brushless motor, again, the torque provided by the motor is linearly proportional to the current used to generate the magnetic field in the windings that will be generated using the torque constant of the motor $$\left(K_t \text{ in} \left[\frac{N \cdot m}{\text{Amp}}\right]\right).$$

$$I_{torque} = \frac{\text{Torque Requested}}{K_t}$$

Substituting $$I_{torque} = E \cdot \text{Torque Requested}$$

Just as in the calculation of $I_{torque}$ in $I_{Vehicle,\ Regen}$ described in Eq. (8), higher torques resulted in higher power losses. The same is true here, except that these extra power losses now contribute to the amount of current that the flywheel siphons off from the battery pack during regenerative braking. While the current is still dissipated and not put to useful work, the sign has changed since it now adds to the current that the flywheel absorbs.

$$I_{torque} = +E \cdot \text{Torque Requested} \quad (14)$$

There is again a current contribution factor from the efficiency of the motor.

Figure 24:
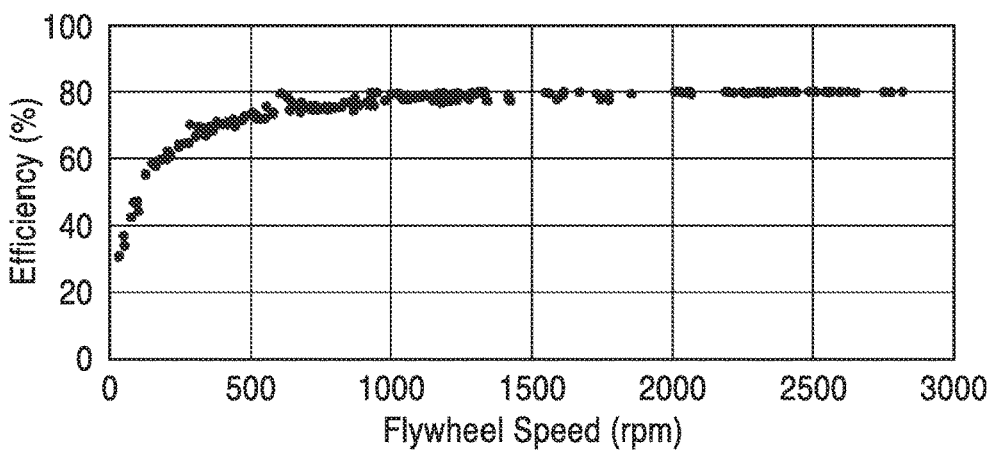
FIG. 24 is a graph of flywheel motor efficiency during acceleration.

FIG. 24 depicts flywheel motor efficiency versus flywheel speed during acceleration, in which it is seen that efficiency is proportional to the speed and increases with the motor speed until it flattens out around 1200 RPM.

The flywheel is capable of reaching speeds upwards of 10,000 RPM and most braking events put it well beyond 1200 RPM. Therefore, the efficiency lost due to speed, while non-negligent, is constant. It can be taken into account in the other terms and this term does not need to be explicitly included as it does not vary like the other factors.

Combining the two relevant factors results in:

$$I_{Flywheel,Absorbed} = I_{rotational} + I_{torque} \quad (15)$$

and substituting each part from Eq. (13) and Eq. (14) results in:

$$I_{Flywheel,Absorbed} = D \cdot (\text{Torque}_{flywheel} \cdot \omega_{flywheel}) + E \cdot \text{Torque}_{flywheel} \quad (16)$$

2.2.c Controller Algorithm

Using the governing equation for this controller Eq. (2):

$$I_{Vehicle,Regen} = I_{Flywheel,Absorbed}$$

and combining the derived components from Eq. (11) and Eq. (16) results in the final form of the open loop controller system model:

$$A \cdot (\text{Torque}_{Brake} \cdot \omega_{wheel}) - B \cdot \text{Torque}_{Brake} + C \cdot \omega_{wheel} = D \cdot (\text{Torque}_{flywheel} \cdot \omega_{flywheel}) + E \cdot \text{Torque}_{flywheel} \quad (17)$$

The open loop controller's primary goal is in determining the necessary flywheel throttle signal necessary to absorb the current generated by the vehicle traction motors during regenerative braking. Therefore, the $\text{Torque}_{flywheel}$ term in Eq. (17) simply needs to be isolated since this is the value we are looking to communicate to the flywheel motor controller.

Solving for $\text{Torque}_{flywheel}$:

$$A \cdot (\text{Torque}_{Brake} \cdot \omega_{wheel}) - B \cdot \text{Torque}_{Brake} + C \cdot \omega_{wheel} = \text{Torque}_{flywheel}[(D \cdot \omega_{flywheel}) + E]$$

$$\text{Torque}_{flywheel} = \frac{A \cdot (\text{Torque}_{Brake} \cdot \omega_{wheel}) - B \cdot \text{Torque}_{Brake} + C \cdot \omega_{wheel}}{(D \cdot \omega_{flywheel}) + E} \quad (18)$$

It is convenient to add a constant term in front to scale all the coefficients at once (e.g., all five), and therefore establish the final form of the open loop controller algorithm.

$$\text{Flywheel Throttle} = \text{Torque}_{flywheel} = F \cdot \left[ \frac{A \cdot (\text{Torque}_{Brake} \cdot \omega_{wheel}) - B \cdot \text{Torque}_{Brake} + C \cdot \omega_{wheel}}{(D \cdot \omega_{flywheel}) + E} \right] \quad (19)$$

2.2.d Other Applications in Future Controllers

While the system model described in the Current Absorbed by the Flywheel a ($I_{Flywheel, Absorbed}$): section was designed to translate the current that the flywheel needs to absorb into a flywheel throttle signal, it has more potential uses. One use comprises its ability for use in predicting the current consumed by the traction motors during acceleration. In this scenario the flywheel would be spinning, storing energy it absorbed during braking. This model can be used to determine how much current the traction motors will be consuming and the flywheel can be regeneratively braked to supply this amount of current, plus some extra to recharge the batteries if allowed. It can therefore potentially be used to reduce battery discharge peaks in addition to battery recharge peaks.

In this scenario the efficiency of the motors does not flatten out as quickly as with the flywheel motor and must be explicitly included. Since efficiency increases with speed, the current contribution term is negative as proportionally less current is used at higher speeds.

Figure 25:
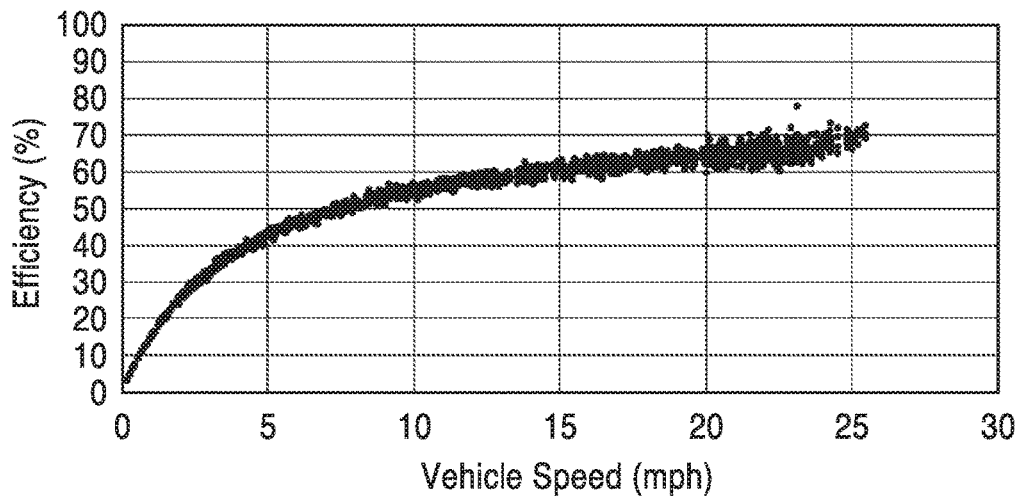
FIG. 25 is a graph of motor efficiency with respect to speed.

FIG. 25 illustrates motor efficiency in relation to vehicle speed, showing that efficiency increases with speed.

The final form of this system model is as follows:

$$I_{vehicle,accel} = I_{rotational} + I_{torque} + I_{efficiency\,loss} \quad (20)$$

$$I_{vehicle,accel} = D \cdot (\text{Torque}_{vehicle,accel} \cdot \omega_{wheel}) + E \cdot \text{Torque}_{vehicle,accel} - F \cdot \omega_{wheel} \quad (21)$$

The accuracy of the model for this type of application is demonstrated using the go-kart traction motors. The values for D, E, and F were tuned for the go-kart traction motors and their values are displayed in Table 3.

Figure 26A:
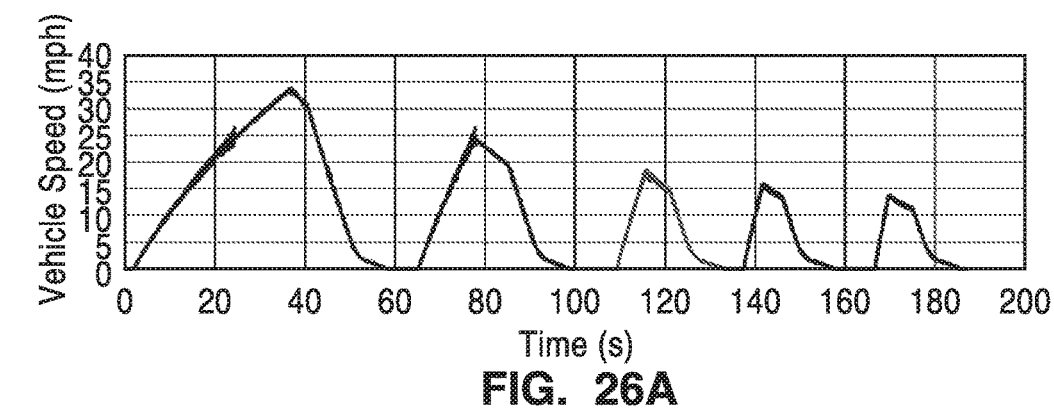
FIG. 26A and FIG. 26B are graphs of vehicle speed and throttle signals for a driving profile.
Figure 26B:
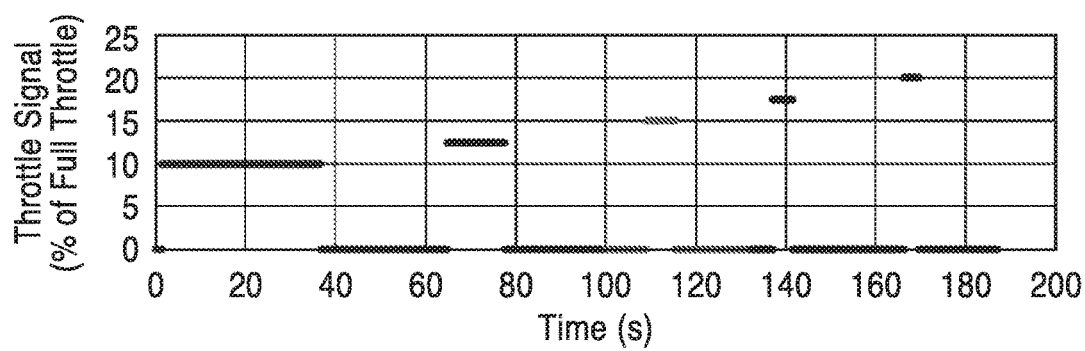

FIG. 26A and FIG. 26B illustrate vehicle speed and throttle signals, respectively, for a driving profile that was designed to demonstrate the generality of this model to a range of vehicle speeds and torques.

Figure 27:
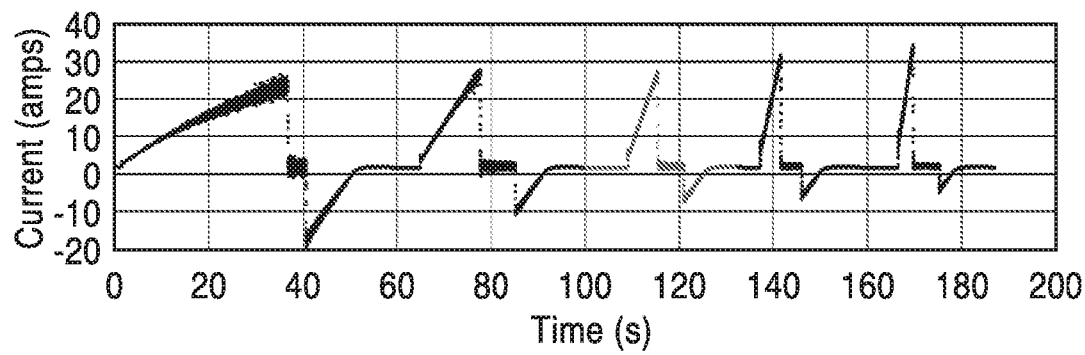
FIG. 27 is a plot of battery current during the driving profile seen in FIG. 27A and FIG. 27B.

FIG. 27 illustrates resulting current data collected using the embodied motor controllers for the driving profiles of FIG. 26A and FIG. 26B.

Figure 28:
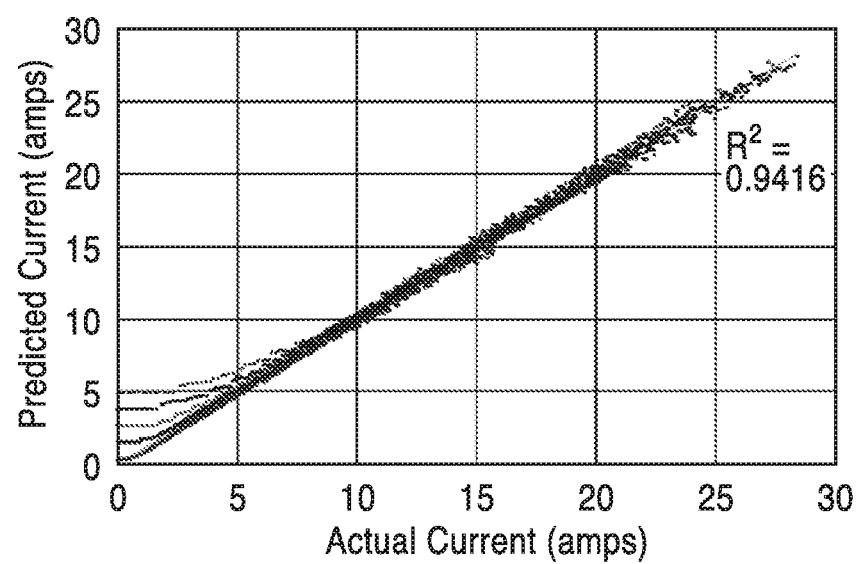
FIG. 28 is a graph comparing predicted battery current and measured current, showing a high-degree of agreement between the model and actual measured data.

FIG. 28 illustrates measured current, the same current data shown in FIG. 27, and the current predicted by the model plotted against each other. Note that there is still good agreement between this simple model and the recorded data. Again it is important to note that this model uses only the accelerator pedal position and the real-time wheel speed and the data is available before the actual current develops so that the flywheel has time to react.

Accordingly, the disclosed INSTAR system leverages the foregoing description. In a preferred embodiment, the INSTAR system comprises a mechanical flywheel, a variable winding DC brushless motor, a safety enclosure system, and a power flow controller. The INSTAR system employs a flywheel kinetic energy recovery system (KERS) to temporarily store the excess regenerative braking energy normally lost as heat. This energy is then sent either directly to the drive motor for acceleration or to the batteries at a rate they can accept.

The INSTAR flywheel energy storage (FES) system is ideally suited for frequent stop-and-go urban driving conditions. The flywheel, acting as a mechanical battery, stores the absorbed braking energy for only 1-2 minutes before being sent either back to the drive motor or to the main chemical battery pack. This allows for: (a) smaller overall size; (b) use of conventional, cost-effective materials; and (c) no magnetic bearings or high vacuum requirements. The system is ideal for widespread commercial vehicle implementation since it has a small size, is scalable, and is modular. The system can make use of conventional parts for low cost fabrication and maintenance, including recyclable materials, ball bearings, Teflon vacuum seals, and rotary oil seals. The motor is preferably a high efficiency DC motor with a variable winding pattern and no mechanical transmission losses.

The enhancements described in the presented technology can be readily implemented within a vehicle control system. It should also be appreciated that vehicle control systems are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with control of the motors and flywheel in response to throttle and braking signals. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, computer processor, central processing unit (CPU), and computer are used synonymously to denote a device capable of executing the instructions and communicating with input/output interfaces and/or peripheral devices, and that the terms processor, computer processor, CPU, and computer are intended to encompass single or multiple devices, single core and multicore devices, and variations thereof.

From the description herein, it will be appreciated that that the present disclosure encompasses multiple embodiments which include, but are not limited to, the following:

1. An inertial storage and recovery system for a vehicle, comprising: (a) a flywheel energy storage system coupled to a drive motor and to a regenerative braking system in a hybrid for fully-electric vehicle; (b) a chemical energy storage device coupled to the regenerative braking system and to the flywheel energy storage system; (c) a power flow controller configured for controlling the operation of said flywheel energy storage system; (d) wherein the flywheel energy storage system absorbs energy from the regenerative braking system during deceleration of the vehicle; (e) wherein the absorbed energy is temporarily stored by the flywheel energy storage device; and (f) wherein the power flow controller is configured to transfer the stored energy to the drive motor or to the chemical energy storage device.

2. The system of any preceding embodiment, wherein the chemical energy storage device comprises a battery.

3. The system of any preceding embodiment, wherein the power flow controller is configured to control power flow into and out of both the chemical energy storage device and the flywheel energy storage system at the same time for transferring energy between the two.

4. The system of any preceding embodiment, wherein the power flow controller is configured to independently and simultaneously control charge and discharge rates of both the chemical energy storage device and the flywheel energy storage system by changing the ratio of power flow into/out of the chemical energy storage device and the flywheel energy storage system.

5. The system of any preceding embodiment, wherein the power flow controller is configured to limit charge current of the chemical energy storage device and send excess energy to the flywheel energy storage system.

6. The system of any preceding embodiment, wherein the power flow controller is configured to transfer the excess energy from the flywheel energy storage system to the chemical energy storage device at a lower rate or to the drive motor to accelerate the vehicle.

7. The system of any preceding embodiment, wherein said apparatus operates a motor controller of said flywheel energy storage system as a current sink or current source, in response to the state of regenerative braking.

8. The system of any preceding embodiment, wherein said system is configured for use in an electric vehicle for increasing range and/or efficiency.

9. The system of any preceding embodiment, wherein said system is configured for use in a hybrid electric vehicle for increasing range and/or efficiency.

10. An inertial storage and recovery system for a vehicle, comprising: (a) a flywheel energy storage system coupled to a drive motor and to a regenerative braking system in a hybrid for fully-electric vehicle; (b) a chemical energy storage device coupled to the regenerative braking system and to the flywheel energy storage system; (c) said flywheel energy storage system including a power flow controller which is configured to control power flow into and out of both the chemical energy storage device and the flywheel energy storage system at the same time and is configured to transfer energy therebetween; (d) wherein the power flow controller is configured to limit charge current of the chemical energy storage device and send excess energy to the flywheel energy storage system; (e) wherein the flywheel energy storage system absorbs energy from the regenerative braking system during deceleration of the vehicle, wherein the absorbed energy is temporarily stored by the flywheel energy storage device; and (f) wherein the power flow controller is configured to transfer the stored energy to the drive motor or to the chemical energy storage device.

11. The system of any preceding embodiment, wherein the chemical energy storage device comprises a battery.

12. The system of any preceding embodiment, wherein the power flow controller is configured to independently and simultaneously control charge and discharge rates of both the chemical energy storage device and the flywheel energy storage system by changing the ratio of power flow into/out of the chemical energy storage device and the flywheel energy storage system.

13. The system of any preceding embodiment, wherein the power flow controller is configured to transfer the excess energy from the flywheel energy storage system to the chemical energy storage device at a lower rate or to the drive motor to accelerate the vehicle.

14. The system of any preceding embodiment, wherein said system is configured for use in an electric vehicle for increasing range and/or efficiency.

15. The system of any preceding embodiment, wherein said system is configured for use in a hybrid electric vehicle for increasing range and/or efficiency.

16. An apparatus for vehicle inertial storage and recovery, comprising: (a) a flywheel energy storage system coupled to at least one drive motor and to a regenerative braking system in a hybrid for fully-electric vehicle; (b) a chemical energy storage device coupled to the regenerative braking system and to the flywheel energy storage system; (c) a power flow controller configured for controlling said flywheel energy storage system to absorb energy from the regenerative braking system during deceleration of the vehicle, and in which the absorbed energy is temporarily stored by the flywheel energy storage device; and (d) wherein the power flow controller is configured to transfer the stored energy to the drive motor or to the chemical energy storage device thus controlling power flow into and out of both the chemical energy storage device and the flywheel energy storage system at the same time for transferring energy between the two; and (e) wherein the power flow controller is configured to limit charge current of the chemical energy storage device and send excess energy to the flywheel energy storage system.

17. The system of any preceding embodiment, wherein the power flow controller is configured to independently and simultaneously control charge and discharge rates of both the chemical energy storage device and the flywheel energy storage system by changing the ratio of power flow into/out of the chemical energy storage device and the flywheel energy storage system.

18. The system of any preceding embodiment, wherein the power flow controller is configured to transfer the excess energy from the flywheel energy storage system to the chemical energy storage device at a lower rate or to the drive motor to accelerate the vehicle.

19. The system of any preceding embodiment, wherein said system is configured for use in an electric vehicle for increasing range and/or efficiency.

20. The system of any preceding embodiment, wherein said system is configured for use in a hybrid electric vehicle for increasing range and/or efficiency.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Optimized geometry and specifications for EVTP

| | |
|---|---|
| Flywheel Diameter | 8" |
| Flywheel Thickness | 1" |
| Flywheel Mass | 6.34 kg |
| Rotational Speed | 25,000 RPM max |
| Factor of Safety (17-4 PH Stainless Steel) | 2.3 |
| Seal Requirements | 6,500 SFM @ 10 PSI |

TABLE 2

Flywheel Throttle Signal Variable

| | | |
|---|---|---|
| Manipulated Variable | Flywheel Throttle Signal [0-2559] | Digital CAN signal |
| Process Variable | Battery Current ($I_{battery}$) [Amps] | Current Sensor |
| Set Point | 20 [Amps] | Controllable |
| Error | 20 − $I_{battery}$ [Amps] | Only when brake signal present |

TABLE 3

Example Values for D, E, F

| Controller Coefficient | Value |
|---|---|
| D | 7.8 |
| E | 5 |
| F | 18 |

What is claimed is:

1. An apparatus for inertial storage and recovery on a vehicle, comprising:
    a flywheel energy storage system coupled to at least one drive motor and to a regenerative braking system in a hybrid or fully-electric vehicle;
    a chemical energy storage device coupled to the regenerative braking system and to the flywheel energy storage system;
    at least one current sensor for determining currents to and from the at least one drive motor, the flywheel energy storage system, and the chemical energy storage device;
    a brake pedal position sensor for generating a brake pedal position value;
    at least one wheel speed sensor for determining wheel speed;
    a power flow controller configured for controlling the operation of said flywheel energy storage system;
    wherein the flywheel energy storage system absorbs energy from the regenerative braking system during deceleration of the vehicle;
    wherein the absorbed energy is temporarily stored by the flywheel energy storage system;
    wherein said power flow controller is configured to estimate an amount of current to be generated from regenerative braking at determined wheel speeds based on receiving values from the brake pedal position sensor and the at least one wheel speed sensor, and sending a throttle signal to the flywheel energy storage system before a peak current value is reached from regenerative braking thus giving said flywheel energy storage system sufficient time to react and absorb peak current;
    wherein the power flow controller is configured to transfer the stored energy to the drive motor for accelerating the vehicle, or to the chemical energy storage device, during deceleration and stopping, to extend charge duration based on levels of current determined from the at least one current sensor to increase charge efficiency and extend life of the chemical energy storage device.

2. The apparatus as recited in claim 1, wherein the chemical energy storage device comprises a battery.

3. The apparatus as recited in claim 1, wherein the power flow controller is configured to control power flow into and out of both the chemical energy storage device and the flywheel energy storage system at the same time for transferring energy between the chemical energy storage device and the flywheel energy storage system.

4. The apparatus as recited in claim 1, wherein the power flow controller is configured to independently and simultaneously control charge and discharge rates of both the chemical energy storage device and the flywheel energy storage system by changing a ratio of power flow into/out of the chemical energy storage device and the flywheel energy storage system.

5. The apparatus as recited in claim 1, wherein the power flow controller is configured to limit charge current of the chemical energy storage device and send excess energy to the flywheel energy storage system.

6. The apparatus as recited in claim 5, wherein the power flow controller is configured to transfer the excess energy from the flywheel energy storage system to the chemical energy storage device at a lower rate than if energy from the regenerative braking system was absorbed directly by the chemical energy storage device.

7. The apparatus as recited in claim 1, wherein said power flow controller operates said flywheel energy storage system as a current sink or current source, in response to the state of regenerative braking.

8. The apparatus as recited in claim 1, wherein said system is configured for use in an electric vehicle for increasing range and/or efficiency.

9. The apparatus as recited in claim 1, wherein said flywheel energy storage system controlled by said power flow controller is configured for use in a hybrid electric vehicle for increasing range and/or efficiency.

10. An apparatus for inertial storage and recovery in a vehicle, comprising:
    a flywheel energy storage system coupled to at least one drive motor and to a regenerative braking system in a hybrid or fully-electric vehicle;
    a brake pedal position sensor for generating a brake pedal position value;
    at least one wheel speed sensor for determining wheel speed;
    a chemical energy storage device coupled to the regenerative braking system and to the flywheel energy storage system;
    said flywheel energy storage system including a power flow controller which is configured to control power flow into and out of both the chemical energy storage device and the flywheel energy storage system at the same time and is configured to transfer energy therebetween;
    wherein the power flow controller is configured to limit charge current of the chemical energy storage device and send excess energy to the flywheel energy storage system;
    wherein the flywheel energy storage system absorbs energy from the regenerative braking system during deceleration of the vehicle, wherein the absorbed energy is temporarily stored by the flywheel energy storage system; and wherein said power flow controller is configured to estimate an amount of current to be generated from regenerative braking at determined wheel speeds based on receiving values from the brake pedal position sensor and the at least one wheel speed sensor, and sending a throttle signal to the flywheel energy storage system before a peak current value is reached, thus giving said flywheel energy storage system sufficient time to react and absorb peak current;

wherein the power flow controller is configured to transfer the stored energy to the at least one drive motor for accelerating the vehicle, or to the chemical energy storage device during deceleration and stopping, to extend charge duration to increase charge efficiency and extend life of the chemical energy storage device.

11. The apparatus as recited in claim 10, wherein the chemical energy storage device comprises a battery.

12. The apparatus as recited in claim 10, wherein the power flow controller is configured to independently and simultaneously control charge and discharge rates of both the chemical energy storage device and the flywheel energy storage system by changing a ratio of power flow into/out of the chemical energy storage device and the flywheel energy storage system.

13. The apparatus as recited in claim 10, wherein the power flow controller is configured to transfer the excess energy from the flywheel energy storage system to the chemical energy storage device at a lower rate than if energy from the regenerative braking system was absorbed directly by the chemical energy storage device.

14. The apparatus as recited in claim 10, wherein said flywheel energy storage system controlled by said power flow controller is configured for use in an electric vehicle for increasing range and/or efficiency.

15. The apparatus as recited in claim 10, wherein said apparatus is configured for use in a hybrid electric vehicle for increasing range and/or efficiency.

16. An apparatus for vehicle inertial storage and recovery, comprising:
a flywheel energy storage system coupled to at least one drive motor and to a regenerative braking system in a hybrid or fully-electric vehicle;
brake pedal position sensing and wheel speed sensing for the hybrid or fully electric vehicle;
a chemical energy storage device coupled to the regenerative braking system and to the flywheel energy storage system;
a power flow controller configured for controlling said flywheel energy storage system to absorb energy from the regenerative braking system during deceleration of the vehicle, and in which the absorbed energy is temporarily stored by the flywheel energy storage system; and
wherein the power flow controller is configured to transfer the stored energy to the drive motor or to the chemical energy storage device thus controlling power flow into and out of both the chemical energy storage device and the flywheel energy storage system at the same time for transferring energy between the chemical energy storage system and the flywheel energy storage system;
wherein said power flow controller is configured to estimate an amount of current to be generated from regenerative braking at determined wheel speeds based on receiving brake pedal position and wheel speed sensing, and sending a throttle signal to the flywheel energy storage system before a peak current value is reached, thus giving said flywheel energy storage system sufficient time to react and absorb peak current; and
wherein the power flow controller is configured to limit charge current of the chemical energy storage device and send excess energy to the flywheel energy storage system for extending charge duration of the chemical energy storage device.

17. The apparatus as recited in claim 16, wherein the power flow controller is configured to independently and simultaneously control charge and discharge rates of both the chemical energy storage device and the flywheel energy storage system by changing a ratio of power flow into/out of the chemical energy storage device and the flywheel energy storage system.

18. The apparatus as recited in claim 16, wherein the power flow controller is configured to transfer the excess energy from the flywheel energy storage system to the chemical energy storage device at a lower rate than if energy from the regenerative braking system was absorbed directly by the chemical energy storage device.

19. The apparatus as recited in claim 16, wherein said apparatus is configured for use in an electric vehicle for increasing range and/or efficiency.

20. The apparatus as recited in claim 16, wherein said apparatus is configured for use in a hybrid electric vehicle for increasing range and/or efficiency.

* * * * *